(12) United States Patent
Finck et al.

(10) Patent No.: US 12,518,187 B2
(45) Date of Patent: Jan. 6, 2026

(54) MULTI-MODE COUPLERS FOR ENHANCED CONNECTIVITY

(71) Applicant: International Business Machines Corporation, Armonk, NY (US)

(72) Inventors: Aaron Finck, White Plains, NY (US); John Blair, Katonah, NY (US); Oliver Dial, Yorktown Heights, NY (US); Jiri Stehlik, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 692 days.

(21) Appl. No.: 17/930,941

(22) Filed: Sep. 9, 2022

(65) Prior Publication Data

US 2024/0086751 A1    Mar. 14, 2024

(51) Int. Cl.
*G06N 10/20* (2022.01)
*G06N 10/40* (2022.01)

(52) U.S. Cl.
CPC ............. *G06N 10/40* (2022.01); *G06N 10/20* (2022.01)

(58) Field of Classification Search
CPC .................................. G06N 10/40; H10N 60/12
See application file for complete search history.

(56) References Cited

U.S. PATENT DOCUMENTS

| | | | | |
|---|---|---|---|---|
| 7,268,576 B2* | 9/2007 | Amin | .................... | B82Y 10/00 365/162 |
| 8,975,912 B2* | 3/2015 | Chow | .................. | H03H 7/0153 326/6 |
| 10,074,792 B1* | 9/2018 | Ferguson | ........... | H03K 19/1952 |
| 10,176,432 B2 | 1/2019 | Abdo et al. | | |
| 10,573,685 B1 | 2/2020 | Adiga et al. | | |
| 10,650,323 B2 | 5/2020 | Epstein et al. | | |
| 10,748,078 B2 | 8/2020 | Filipp et al. | | |
| 10,749,095 B2 | 8/2020 | Ferguson et al. | | |

(Continued)

OTHER PUBLICATIONS

Goto, Double-Transmon coupler: Fast two-qubit gate with no residual coupling for highly detuned superconducting qubits, Frontier Research Laboratory, Mar. 22, 2022, pp. 1-9 (Year: 2022).*

(Continued)

*Primary Examiner* — Nghia M Doan
(74) *Attorney, Agent, or Firm* — Amin, Turocy & Watson, LLP

(57) ABSTRACT

Techniques and couplers for managing coupling between qubits are presented. A first tuneable coupler qubit (TCQ) can comprise a first frequency mode and a second frequency mode. A second TCQ can comprise a third frequency mode and a fourth frequency mode. First TCQ can be selectively coupled to a first qubit based on the first frequency mode and selectively coupled to the second TCQ based on the second and third frequency modes. Second TCQ can be selectively coupled to a second qubit based on the fourth frequency mode. When certain respective magnetic fluxes are applied to first and second TCQs, ZZ interaction between the first and second qubits can be suppressed. When respective modified magnetic fluxes are applied to first and second TCQs to excite respective frequency modes, coupling can occur, and ZZ interaction and an entangled gate can be created between the first and second qubits.

20 Claims, 17 Drawing Sheets

(56) References Cited

U.S. PATENT DOCUMENTS

| | | |
|---|---|---|
| 11,210,600 B2 | 12/2021 | von Salis et al. |
| 11,348,024 B2 | 5/2022 | Harris et al. |
| 2020/0320426 A1 | 10/2020 | Amin et al. |
| 2020/0335686 A1 | 10/2020 | Shao et al. |
| 2021/0182728 A1 | 6/2021 | Neil et al. |
| 2021/0192380 A1 | 6/2021 | Jin et al. |
| 2021/0406746 A1 | 12/2021 | Stehlik et al. |
| 2021/0408112 A1 | 12/2021 | Finck et al. |
| 2021/0408113 A1 | 12/2021 | Finck et al. |
| 2022/0059919 A1 | 2/2022 | Underwood et al. |
| 2022/0108200 A1 | 4/2022 | Suttle et al. |
| 2023/0180631 A1* | 6/2023 | Finck ............... G06N 10/20 327/366 |

OTHER PUBLICATIONS

Sete et al., Floating tunable coupler for scalable quantum computing architectures, arXiv:2103.07030v2 [quant-ph], Jun. 25, 2021, 12 pgs.

Goto, Double-transmon coupler: Fast two-qubit gate with no residual coupling for highly detuned superconducting qubits, arXiv:2203.11451v1 [quant-ph], Mar. 22, 2022, 9 pgs.

Ciani et al., Three-qubit direct dispersive parity measurement with Tunable Coupling Qubits, rotatarXiv:1708.04175v1 [quant-ph], Aug. 14, 2017, 19 pgs.

Gu et al., Fast Multiqubit Gates through Simultaneous Two-Qubit Gates, PRX Quantum 2, 040348, Aug. 25, 2021, 28 pgs.

Finck et al., Suppressed crosstalk between two-junction superconducting qubits with mode-selective exchange coupling, https://arxiv.org/abs/2105.11495, Nov. 22, 2021, 7 pgs.

Stehlik et al., Tunable Coupling Architecture for Fixed-frequency Transmons, https://arxiv.org/abs/2101.07746, Jan. 19, 2021.

Sung et al., Realization of High-Fidelity CZ and ZZ-Free iSWAP Gates with a Tunable Coupler, Physical Review X 11, 021058, Jun. 16, 2021, 32 pgs.

Chamberland et al., Topological and subsystem codes on low-degree graphs with flag qubits, https://arxiv.org/pdf/1907.09528, Dec. 24, 2019, 21 pgs.

Zajac et al., Spectator Errors in Tunable Coupling Architectures, https://arxiv.org/pdf/2108.11221, Aug. 25, 2021, 5 pgs.

International Search Report and Written Opinion received for PCT Application Serial No. PCT/IB2023/058665 dated Nov. 23, 2023, 12 pages.

Gold et al., "Entanglement Across Separate Silicon Dies in a Modular Superconducting Qubit Device", Quantum Artificial Intelligence Laboratory, Mar. 11, 2021, 9 pages.

Zhao et al., "Tunable Coupling of Widely Separated Superconducting Qubits: A Possible Application Towards a Modular Quantum Device", Beijing Academy of Quantum Information Sciences, Jan. 10, 2022, 11 pages.

* cited by examiner

MULTI-MODE COUPLERS FOR ENHANCED CONNECTIVITY

BACKGROUND

The subject disclosure relates to quantum circuitry, and more specifically, to multi-mode couplers for enhanced connectivity.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, methods, apparatuses, and/or computer program products that can facilitate creating and/or utilizing tuneable multi-mode couplers that can manage interactions and couplings between quantum components, such as qubits, are presented.

According to an embodiment, a system can comprise a first quantum component. The system also can comprise a first coupler qubit that can be operable in a first mode associated with a first frequency and a second mode associated with a second frequency. The first coupler qubit can be selectively coupled to the first quantum component based on the first mode. The first coupler qubit can be selectively coupled to a second coupler qubit based on the second mode and based on a third mode operable on the second coupler qubit. The third mode can be associated with a third frequency. An advantage of the system can be that the system can have enhanced (e.g., increased, improved, or optimized) efficiency, reliability, and performance relating to interactions or coupling between quantum components (e.g., qubits or other quantum components).

In one or more embodiments of the above-indicated system, the first coupler qubit can comprise a Josephson junction and a superconducting quantum interference device associated with the Josephson junction, where the superconducting quantum interference device can be flux tuneable. In one or more embodiments, based on the first coupler qubit being selectively coupled to the first quantum component, which can be a first qubit, via the first mode, the first coupler qubit being selectively coupled to the second coupler qubit via the second mode and the third mode, and a second coupler qubit being selectively coupled to a second qubit via a fourth mode, a ZZ interaction and a static ZZ interaction between the first qubit and the second qubit can be suppressed, and an exchange interaction between the first qubit and the second qubit can be suppressed for a defined range of frequencies associated with the first qubit and the second qubit.

In one or more embodiments of the above-indicated system, the system can comprise a coplanar-waveguide resonator that can comprise a first port and a second port, where a first plate of a first capacitor component can be connected to the first coupler qubit, a second plate of the first capacitor component can be connected to the first port, a third plate of a second capacitor component can be connected to the second port, and a fourth plate of the second capacitor component can be connected to the second coupler qubit. In one or more embodiments of the above-indicated system, the system can comprise a third coupler qubit, a group of capacitor components that can comprise first, second, and third capacitor components, and a bus component that can be associated with the group of capacitor components, where the first coupler qubit can be associated with the first capacitor component, the second coupler qubit can be associated with the second capacitor component, and the third coupler qubit can be associated with the third capacitor component.

Advantages of the system can include that the system can enhance (e.g., increase, improve, or optimize) connectivity between quantum components (e.g., qubits or other quantum components), can enhance layout of electronic elements or quantum components of quantum circuitry, and can enhance management of interactions or coupling between quantum components, which can include enhanced mitigation or suppression of undesired interactions, coupling, and entanglements between quantum components.

In some embodiments, elements described in connection with the disclosed systems can be embodied in different forms such as a device, a method, or another form.

These and other features will become apparent from the following detailed description of illustrative embodiments thereof, which is to be read in connection with the accompanying drawings.

DETAILED DESCRIPTION

Figure 1:
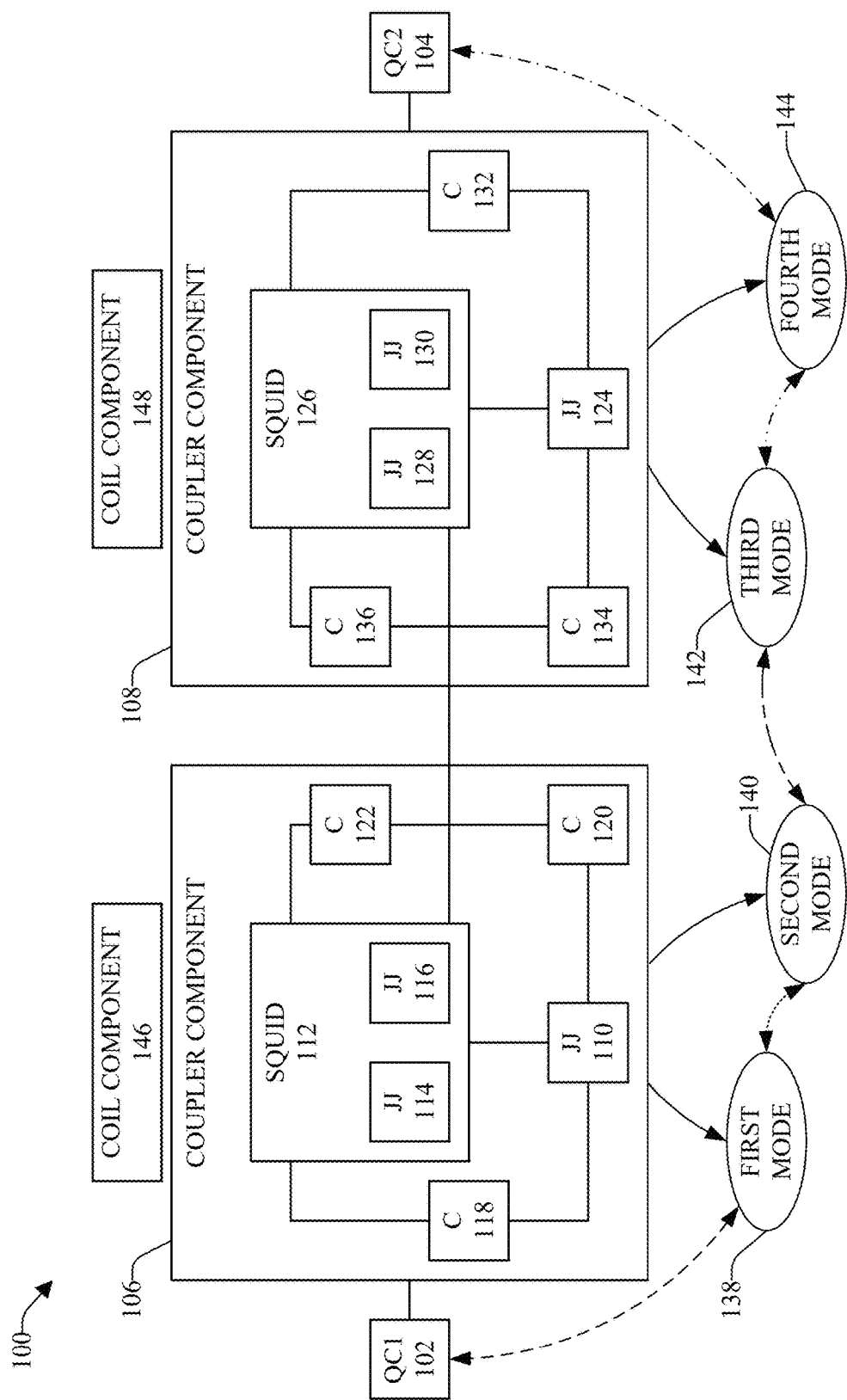
FIG. 1 illustrates a block diagram of an example, non-limiting system that can comprise a pair of coupler components that can manage interaction or coupling between quantum components, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computers can comprise a group of qubits that can perform quantum operations on data. In quantum circuits comprising qubits, a coupler can be utilized to enable qubit-to-qubit interactions or couplings between a pair of qubits to create quantum logic gates. Couplers also can be used to enable interactions or couplings between other types of electronic elements in a quantum circuit.

With regard to interactions, couplings, and gates, to facilitate description of various aspects and embodiments of the disclosed subject matter, the following can provide definitions and/or context that may be relevant to the disclosed subject matter. An entangling gate can comprise an operation in which external fields (e.g., microwave pulses) can be applied to a quantum processor, comprising qubits, to create an entangled state between two or more separate qubits. A controlled-phase (CPHASE) gate can be a particular type of entangling gate in which one qubit can acquire a phase shift if and only if both qubits are in their first excited state.

A ZZ interaction can be a type of interaction between two qubits or modes in which the excitation of one qubit can cause a shift in the transition frequency of the other qubit or mode. Thus, the ZZ interaction can represent a way to entangle two different qubits and create a CPHASE gate because a state-dependent shift in qubit frequency can be made equivalent to a state-dependent phase shift. A ZZ interaction sometimes can be referred to as longitudinal coupling or can be denoted as chi or 2-chi. A static ZZ interaction can be a type of ZZ interaction that can be present between two qubits or modes in the absence of any external microwave drives (e.g., microwave pulses). The static ZZ interaction can be an "always-on" interaction that can be undesired (e.g., unwanted) and detrimental to a system of qubits by inhibiting independent control of each qubit and by created undesired entanglement.

An exchange interaction can be a type of interaction between quantum systems that can allow energy to be exchanged. If present between two qubits, applying microwave pulses to one qubit can potentially excite the other qubit, and thus, such an interaction can be an undesired form of crosstalk that can be detrimental to the quantum system.

With some existing quantum circuits and couplers, there can be an always-on interaction, such as a static ZZ interaction, between two qubits or modes, even in the absence of any external microwave drives. Such an always-on interaction can be undesirable and detrimental to a system of qubits, as it can inhibit independent control of each qubit and can create undesired (e.g., unwanted) entanglement between qubits.

It can be desirable to enhance (e.g., increase, improve, or optimize) the efficiency, reliability, and performance of coupler components, enhance connectivity between qubits (or other quantum components), and enhance layout of electronic elements of quantum circuitry. It also can be desirable to enhance the management of interactions and coupling between qubits (or other quantum components), including mitigating or suppressing undesired interactions, coupling, and entanglements between qubits (or other quantum components).

The disclosed subject matter comprises coupler components and techniques that can have a number of advantages and can overcome the various deficiencies of existing couplers and coupling techniques. The disclosed coupler components and techniques for coupling of qubits can have enhanced (e.g., increased, improved, or optimized) efficiency, reliability, and performance, can enhance connectivity between qubits (or other quantum components), can enhance layout of electronic elements of quantum circuitry, can enhance management of interactions and coupling between qubits, including enhanced mitigation or suppression of undesired interactions, coupling, and entanglements between qubits (or other quantum components), as compared to existing couplers and techniques.

To that end, various embodiments described herein relate to techniques for managing coupling between qubits. In some embodiments, tuneable multi-mode couplers can be operated in pairs that can provide enhanced (e.g., improved) connectivity and long-range interactions between qubits (e.g., fixed-frequency transmon qubits) or other types of quantum components. A system or device can comprise a first tuneable coupler qubit (TCQ) that can comprise a first mode (e.g., a first "A" mode) associated with a first frequency (e.g., a first mode of oscillation) and a second mode (e.g., a first "B" mode) associated with a second frequency (e.g., a second mode of oscillation). A TCQ also can be referred to as a TCQ coupler. The system or device also can comprise a second TCQ that can comprise a third mode (e.g., a second "B" mode) associated with a third frequency and a fourth mode (e.g., a second "A" mode) associated with a fourth frequency. The first TCQ can be associated with (e.g., selectively connected or coupled to) a first quantum component (e.g., qubit, resonator, or other electronic element), and the second TCQ. The second TCQ can be associated with a second quantum component. The first TCQ and the second TCQ can be associated with (e.g., selectively connected or coupled to) each other, for example, through direct capacitive coupling, a bus component, or via a co-planar waveguide (CPW), such as described herein.

The respective frequencies associated with the respective modes can be same as or different from each other. For instance, the first frequency associated with the first mode (e.g., first "A" mode) can be same as or different from the fourth frequency associated with the fourth mode (e.g., second "A" mode), and the second frequency associated with the second mode (e.g., first "B" mode) can be same as or different from the third frequency associated with the third mode (e.g., second "B" mode).

The first TCQ can be selectively coupled to a first qubit based on the first frequency mode, and selectively coupled to the second TCQ based on the second and third frequency modes. The second TCQ can be selectively coupled to a second qubit based on the fourth frequency mode. For instance, when certain respective magnetic fluxes are applied to the first TCQ (e.g., a flux-tuneable SQUID of the first TCQ) and the second TCQ (e.g., a flux-tuneable SQUID of the second TCQ), this can result in a desired balance between the respective modes of the respective TCQs, and interaction and coupling between the first qubit and second qubit can be desirably suppressed. For example, ZZ interaction or coupling, including static ZZ interaction, between the first qubit and second qubit can be desirably suppressed, and an exchange interaction between the first qubit and second qubit can be desirably suppressed for a wide range of qubit frequencies between the qubits, based on the mode-selective coupling (e.g., utilizing pairs of TCQs, such as the first TCQ and second TCQ).

The first TCQ can be selectively coupled to a first qubit based on the first frequency mode, and selectively coupled to the second TCQ based on the second and third frequency modes. The second TCQ can be selectively coupled to a second qubit based on the fourth frequency mode. For instance, when certain respective magnetic fluxes are applied to the first TCQ (e.g., a flux-tuneable SQUID of the first TCQ) and the second TCQ (e.g., a flux-tuneable SQUID of the second TCQ), this can result in a desired balance between the respective modes of the respective TCQs, and interaction and coupling between the first qubit and second qubit can be desirably suppressed. For example, ZZ interaction or coupling, including static ZZ interaction, between the first qubit and second qubit can be desirably suppressed, and an exchange interaction between the first qubit and second qubit can be desirably suppressed for a wide range of qubit frequencies between the qubits, based on the mode-selective coupling (e.g., utilizing pairs of TCQs, such as the first TCQ and second TCQ).

When respective modified magnetic fluxes are applied to the first TCQ and the second TCQ to desirably adjust tuning of the respective TCQs (e.g., to adjust tuning of the respective SQUIDS of the respective TCQs), this can cause respective imbalances to occur in the first TCQ and the second TCQ (e.g., such as described herein), which can excite the respective modes of the first TCQ and second TCQ, and, and a result, a desired coupling can be created, wherein a ZZ interaction, an entangled interaction and gate, and/or a controlled-phase (CPHASE) gate can be created between the first qubit and second qubit via the interaction (e.g., coupling) between the pair of TCQs, the interaction between the first qubit and first TCQ, and the interaction between the second qubit and second TCQ. A coupling may be defined as an interaction between two systems (e.g., between a first system, comprising a first qubit and/or a first TCQ, and a second system, comprising a second qubit and/or a second TCQ) strong enough to create a multi-qubit gate (e.g., between two qubits) and/or a desired exchange of information or energy between two electronic elements (e.g., electronic elements, which can be qubits, resonators, or other desired electronic elements or components).

In some embodiments, four or more TCQs (e.g., first TCQ, second TCQ, and other TCQ couplers) can be coupled (e.g., selectively coupled) together via a capacitive and/or a CPW resonator bus, such as described herein. With regard to using CPW resonators to couple TCQs together, the CPW resonators can enable desirable long-range coupling of TCQs across a same integrated circuit (IC) chip (e.g., same qubit chip or same die), or between or across multiple IC chips using bump bonds.

In certain embodiments, the qubits can be quadrupole transmon qubits that can be respectively associated with (e.g., selectively coupled) to TCQs. The quadrupole transmon qubits and TCQs can be arranged in a desirably dense square lattice that can enable desirable (e.g., enhanced, improved, or optimized) connectivity and selectivity between quadrupole transmon qubits. A quadrupole transmon qubit can be associated with (e.g., selectively coupled to) a desired number of TCQs (e.g., four TCQs, or more or less than four TCQs), such as described herein.

These and other aspects and embodiments of the disclosed subject matter will now be described with respect to the drawings.

FIG. 1 illustrates a block diagram of an example, non-limiting system 100 that can comprise a pair of coupler components that can manage interaction or coupling between quantum components (e.g., qubits, resonators, or other electronic components or elements), in accordance with various aspects and embodiments of the disclosed subject matter. The system 100 can comprise various components and circuitry (e.g., quantum components and circuitry) that can be arranged to perform one or more desired functions, such as described herein. The system 100 can comprise or be part of, for example, a multi-qubit device or package that can have dimensions (e.g., the integrated circuit (IC) chip on which the system 100 can reside can have dimensions) that can vary, wherein the length of the device or package can range, for example, from on the order of millimeters to on the order of tens of millimeters, the width of the device or package can range, for example, from on the order of millimeters to on the order of tens of millimeters, and the thickness can range, for example, from approximately 1 millimeter (mm) to approximately 3 mm. It is to be appreciated and understood that these dimensions of the device or package are exemplary, and, in accordance with other embodiments, the device or package can have different (e.g., smaller or larger) dimensions than the example dimensions described herein.

In some embodiments, the system 100 can comprise a first quantum component (QC1) 102 and a second quantum component (QC2) 104 that can be formed as part of a quantum circuit, which can be formed on one or more chip stacks formed on one or more dies (e.g., IC chips). The first quantum component 102 and second quantum component 104 can be part of a group of quantum components of a quantum computer (e.g., superconducting quantum computer). In certain embodiments, the first quantum component 102 and second quantum component 104 can be transmon qubits or quadrupole transmon qubits, although, in other embodiments, the first quantum component 102 and second quantum component 104 can be a different type of qubit. A qubit can comprise, for example, one of more Josephson junctions (JJs) and a shunt capacitor that can be associated with the one or more Josephson junctions. In some embodiments, the first quantum component 102 and/or second quantum component 104 can be a different type of quantum component, such as a resonator or other type of electronic element that can be employed in a quantum circuit.

It can be desired (e.g., wanted, needed, or suitable) to manage (e.g., control) interactions, couplings, and/or gates between quantum components, such as the quantum component 102 and second quantum component 104. In accordance with various embodiments, the system 100 can comprise a pair of coupler components (e.g., pair of TCQs), including a coupler component (CC) 106 and CC 108, that can enable and manage interactions and coupling between the first quantum component 102 and second quantum component 104. The CCs 106 and 108 can be situated between (e.g., logically or physically between) the first quantum component 102 and second quantum component 104 in the quantum circuit. One end of the CC 106 can be associated with (e.g., directly or indirectly connected or coupled to) the first quantum component 102, and another end of the CC 106 can be associated with (e.g., directly or indirectly connected or coupled to) one end of the CC 108. The other end of the CC 108 can be associated with (e.g., directly or indirectly connected or coupled to) the second quantum component 104. The CCs 106 and 108 can control and enable quantum component-to-quantum component (e.g., qubit-to-qubit) interactions (e.g., interactions between the first quantum component 102 and second quantum component 104) that can allow for quantum logic gates or other desired types of interactions. In some embodiments, the quantum components 102 and 104 can be respectively coupled to the CCs 106 and 108 using coupling capacitors, and/or the CC 106 and CC 108 can be coupled to each other using a coupling capacitor, such as more fully described herein.

In accordance with various embodiments, the CC 106 and CC 108 each can be a TCQ (e.g., a flux-tuneable TCQ). For instance, the CC 106 and CC 108 can be TCQs that can enable one or more parameters (e.g., frequency, or another desired parameter) associated with the CC 106 and CC 108 to be desirably tuned (e.g., modified, adjusted, or changed) based on magnetic fluxes respectively applied to the CC 106 and CC 108, such as more fully described herein.

The CC 106 can comprise a JJ 110 and a SQUID 112 (e.g., flux-tuneable SQUID), wherein the SQUID 112 can comprise a JJ 114 and JJ 116. The CC 106 also can comprise a capacitor (C) 118, which can be a shunt capacitor that can be associated with the JJ 110 and SQUID 112, a capacitor 120 that can be associated with the JJ 110, and a capacitor 122 that can be associated with the SQUID 112. The CC 108 can comprise a JJ 124 and a SQUID 126 (e.g., flux-tuneable SQUID), wherein the SQUID 126 can comprise a JJ 128 and JJ 130. The CC 108 also can comprise a shunt capacitor 132 that can be associated with the JJ 124 and SQUID 126, a capacitor 134 that can be associated with the JJ 124, and a capacitor 136 that can be associated with the SQUID 126.

In the CC 106, the JJ 110 and SQUID 112 can be structured, designed, and/or arranged in the quantum circuit in relation to each other such that multiple modes of oscillation can be created, where the multiple modes can comprise a first mode (e.g., "A" mode) of oscillation 138 and a second mode (e.g., "B" mode) of oscillation 140. The first mode of oscillation 138 can be associated with a first frequency, and the second mode of oscillation 140 can be associated with a second frequency. The second frequency associated with the second mode 140 typically can be higher than the first frequency associated with the first mode 138. The second mode 140 also can be referred to as a dark mode because it typically may have no net dipole moment. The first mode 138 and second mode 140 can be two distinct modes that can correspond to symmetric and antisymmetric combinations of excitations associated with the JJ 110 and SQUID 112.

Similarly, in the CC 108, the JJ 124 and SQUID 126 can be structured, designed, and/or arranged in the quantum circuit in relation to each other such that multiple modes of oscillation can be created, where the multiple modes can comprise a third mode (e.g., another "B" mode) of oscillation 142 and a fourth mode (e.g., another "A" mode) of oscillation 144. The third mode 142 can be associated with a third frequency, which can be different from or same as the second frequency associated with the second mode 140. The fourth mode 144 can be associated with a fourth frequency, which can be different from or same as the first frequency associated with the first mode 138. The third frequency associated with the third mode 142 typically can be higher than the fourth frequency associated with the fourth mode 144. The third mode 142 also can be referred to as a dark mode because it typically may have no net dipole moment. The third mode 142 and fourth mode 144 can be two distinct modes that can correspond to symmetric and antisymmetric combinations of excitations associated with the JJ 124 and SQUID 126.

Figure 2:
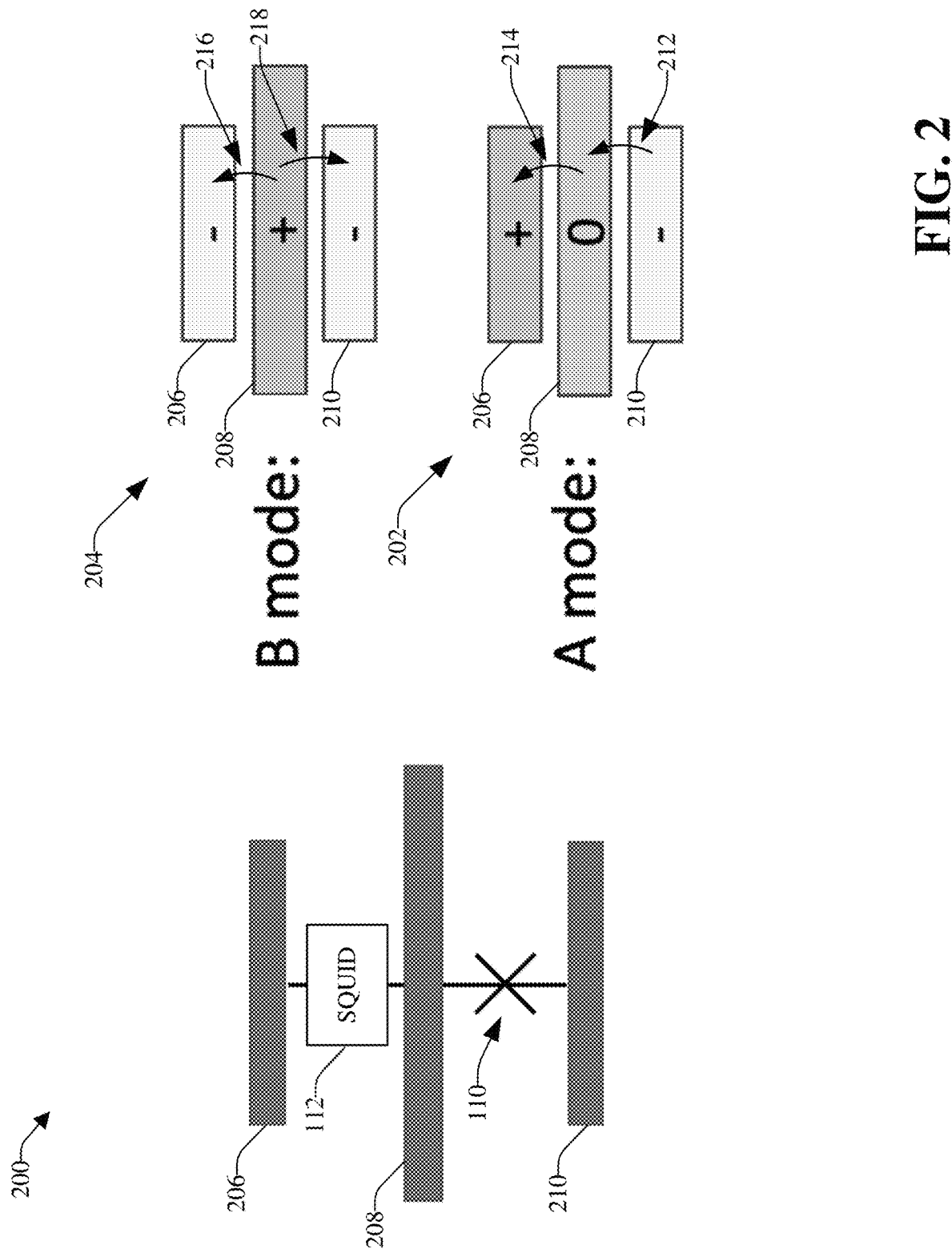
FIG. 2 depicts a block diagram of example, non-limiting mode structures of modes of a coupler component, in accordance with various aspects and embodiments of the disclosed subject matter.

Referring briefly to FIG. 2 (along with FIG. 1), FIG. 2 depicts a block diagram of example, non-limiting mode structures 200 of the modes of a CC (e.g., CC 106, CC 108), in accordance with various aspects and embodiments of the disclosed subject matter. The mode structures 200 can comprise an "A" mode structure 202 of the "A" mode (e.g., first mode 138) and a "B" mode structure 204 of the "B" mode (e.g., second mode 140) of the CC 106.

The JJ 110 and the SQUID 112 of the CC 106 (e.g., flux-tuneable TCQ) can be associated with (e.g., connected to) respective capacitor pads (e.g., capacitor plates), such as capacitor pads 206, 208, and 210, of respective capacitors of the CC 106. As shown in the "A" mode structure 202, in the "A" mode of the CC 106, charge can flow from the capacitor pad 210 to the capacitor pad 208 (as indicated at reference numeral 212), and the charge also can flow in the same direction from the capacitor pad 208 to the capacitor pad 206 (as indicated at reference numeral 214). As a result, no net charge is accumulating in the capacitor pad 208, and this that can be symmetric or antisymmetric, depending on how the direction of the charge is defined. As shown in the "B" mode structure 204, in the "B" mode of the CC 106, charge can flow from the capacitor pad 208 to the capacitor pad 206 and the capacitor pad 210 (as indicated at reference numerals 216 and 218, respectively).

With further regard to FIG. 1, in some embodiments, the first quantum component 102 can be selectively coupled to the CC 106 based on the first mode 138 (e.g., the first quantum component 102 can be selectively coupled to the first (or "A") mode 138 of the CC 106). The second quantum component 104 can be selectively coupled to the CC 108 based on the fourth mode 144 (e.g., the second quantum component 104 can be selectively coupled to the fourth (or other "A") mode 144 of the CC 108). Also, the CC 106 and CC 108 can be selectively coupled to each other based on the second (or "B") mode 140 of the CC 106 and the third (or other "B") mode 142 of the CC 108.

The pair of CCs 106 and 108 can desirably (e.g., suitably, enhancedly, or optimally) manage interactions (e.g., ZZ interactions, static ZZ interactions, exchange interactions, or other interactions), coupling, and gates (e.g., a ZZ gates, entangling gates, CPHASE gates, or other gates) between the first quantum component 102 and second quantum component 104 to facilitate desirably managing interactions and coupling between the first quantum component 102 and second quantum component 104. Using the respective SQUIDs 112 and 126, the CCs 106 and 108 can be desirably tuned to facilitate exciting, or not exciting, their respective modes (e.g., 138, 140, 142, 144), which can enable the CCs 106 and 108 to manage the interactions, coupling, and gates between the first quantum component 102 and second quantum component 104.

To facilitate tuning the CCs 106 and 108, the system 100 can comprise a coil component 146 that can be associated with and in proximity to the CC 106, and a coil component 148 that can be associated with and in proximity to the CC 108. The coil component 146 can be employed to apply a desired magnetic field or flux to the CC 106 (e.g., to the SQUID 112 of the CC 106) based on a current supplied to the coil component 146. The coil component 148 can be employed to apply a desired magnetic field or flux to the CC 108 (e.g., to the SQUID 126 of the CC 108) based on a current supplied to the coil component 148. The magnetic field created and applied by the coil component 148 can be different from or same as the magnetic flux created and applied by the coil component 146, depending in part on the respective characteristics (e.g., characteristics of a barrier of a JJ, characteristics of the materials of components, inductance, impedance, or other characteristics) of or associated with the respective components (e.g., JJs, SQUIDS, or other components) of the CC 106 and CC 108. Under certain magnetic fluxes applied to the CC 106 and CC 108, the respective modes (e.g., 138, 140, 142, 144) can be maintained in or transitioned to a non-excited state, which can suppress coupling between the first quantum component 102 and second quantum component 104 and/or suppress interaction or coupling between respective components (e.g., between the first quantum component 102 and CC 106, between the CC 106 and CC 108, and/or between the second quantum component 104 and CC 108) of the system 100.

For instance, the coil component 146 can apply an amount of magnetic flux to the SQUID 112 of the CC 106 that can cause a critical current of the SQUID 112, and accordingly, a first energy (e.g., first Josephson energy) associated with the SQUID 112, to be equal or at least substantially equal to a critical current of the JJ 110 of the CC 106, and accordingly, a second energy (e.g., second Josephson energy) associated with the JJ 110. Also, the coil component 148 can apply a respective amount of magnetic flux to the SQUID 126 of the CC 108 that can cause a critical current of the SQUID 126, and accordingly, a third energy (e.g., third Josephson energy) associated with the SQUID 126, to be equal or at least substantially equal to a critical current of the JJ 124 of the CC 108, and accordingly, a fourth energy (e.g., fourth Josephson energy) associated with the JJ 124. As a result, there can be a balancing of the first energy and the second energy associated with the CC 106, and a balancing of the third energy and the fourth energy associated with the CC 108, which can provide and/or enforce desired mode-selective coupling associated with the CCs 106 and 108, and which can thereby cause or create a desired suppression (e.g., squelching) of interaction or coupling (e.g., ZZ, static ZZ, and/or exchange interaction or coupling) between the first quantum component 102 and second quantum component 104 to essentially or approximately zero interaction or coupling.

If the magnetic fluxes applied to the CCs 106 and 108 by coil component 146 and coil component 148 are modified (e.g., changed or adjusted) to certain respective amounts of magnetic flux to adjust the tuning of the CCs 106 and 108 (e.g., adjust the tuning associated with the SQUID 112 and SQUID 126), the respective modes (e.g., 138, 140, 142, 144) can be transitioned to an excited state, which can allow a desired interaction or coupling between the first quantum component 102 and second quantum component 104 (as well as interaction or coupling between other desired components).

For example, modifying the magnetic flux that is applied to the SQUID 112 of the CC 106 can create an imbalance between the first energy (e.g., as such first energy can be modified based on the modified magnetic flux) associated with the SQUID 112 and the second energy of the JJ 110 of the CC 106. This imbalance can result in excitation of the modes of the CC 106 and can alter the mode-selective coupling associated with the CC 106 such that the first quantum component 102 can have desired interaction or coupling to both the first mode and second mode of the CC 106. Similarly, modifying the magnetic flux that is applied to the SQUID 126 of the CC 108 can create an imbalance between the third energy (e.g., as such third energy can be modified based on the modified magnetic flux) associated with the SQUID 126 and the fourth energy of the JJ 124 of the CC 108. This imbalance can result in excitation of the modes of the CC 108 and can alter the mode-selective coupling associated with the CC 108 such that the second quantum component 104 can have desired interaction or coupling to both the third mode and fourth mode of the CC 108. Such altering of the mode-selective coupling associated with the CCs 106 and 108 also can create or allow a desired coupling between the CC 106 and CC 108. As a result, the pair of CCs 106 and 108, employing mode-selective coupling, can create a desired interaction, coupling, and/or gate (e.g., ZZ interaction or coupling, exchange interaction or coupling, exchange gate, and/or CPHASE gate) between the first quantum component 102 and second quantum component 104 via the CCs 106 and 108.

It is to be appreciated and understood that, while, in some embodiments, the CCs 106 and 108 (e.g., TCQs) can comprise SQUIDS, in certain other embodiments, a CC (e.g., TCQ) can utilize a single tuneable JJ (e.g., single electrostatic voltage tuneable JJ) in place of a SQUID (e.g., SQUID comprising two JJs) in the CC. Such a tuneable JJ (e.g., single electrostatic voltage tuneable JJ) can be tuned by applying a certain electrostatic voltage to the tuneable JJ to adjust the tuning of the tuneable JJ, for example, to facilitate turning the CC to an on state (e.g., to enable desired interaction or coupling between the quantum components) or an off state (e.g., to inhibit, suppress, minimize, or prevent undesired interaction or coupling between the quantum components). For instance, there can be a conductive or capacitive pad or wire in proximity to the single tuneable JJ, wherein a certain voltage can be applied to the conductive or capacitive pad or wire, which can cause the conductive or capacitive pad or wire to apply a certain electrostatic charge to the tuneable JJ to adjust the tuning of that tuneable JJ.

Figure 3:
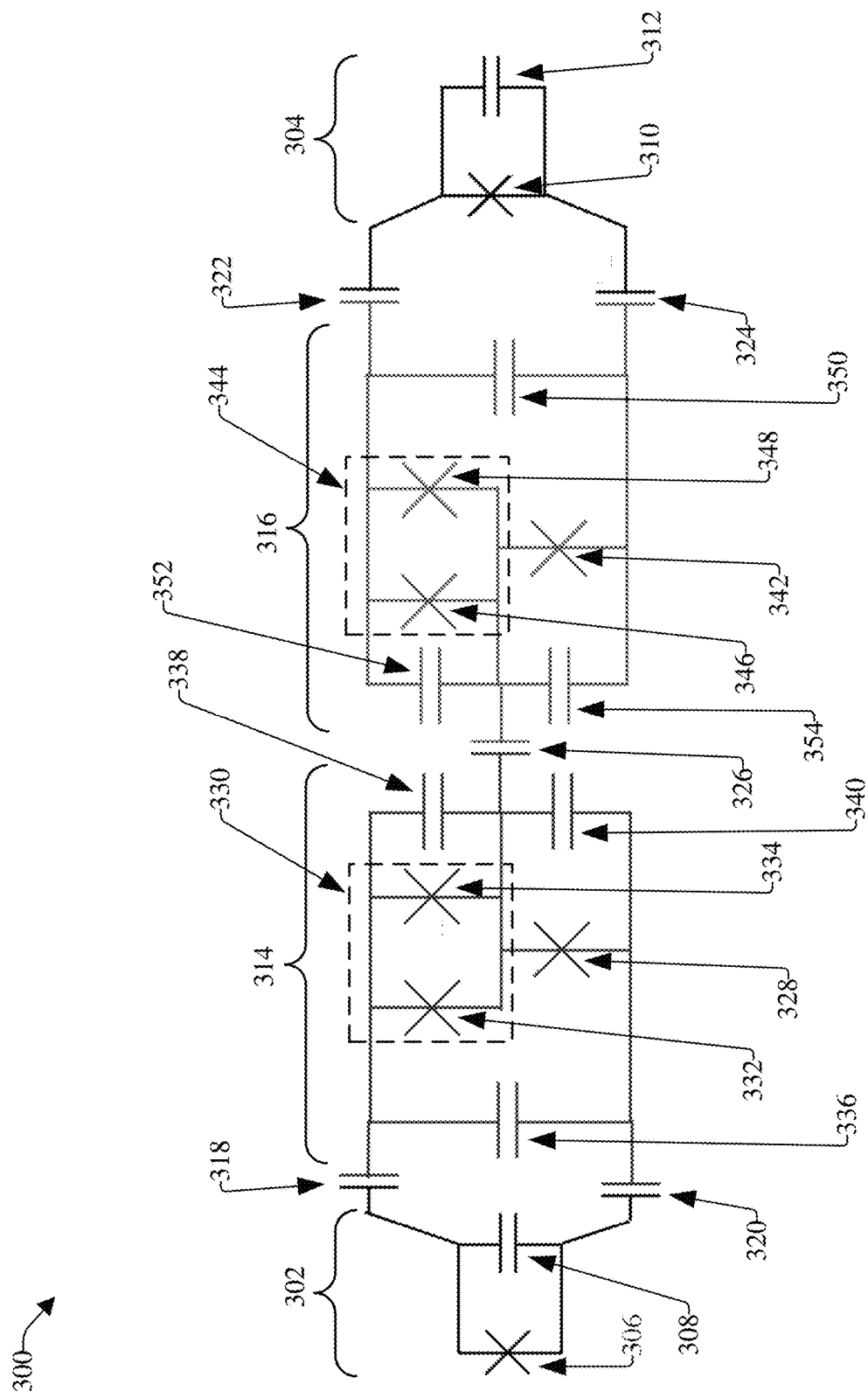
FIG. 3 illustrates a diagram of an example, non-limiting system that can comprise a pair of tuneable coupler components that can manage interaction or coupling between qubits, in accordance with various aspects and embodiments of the disclosed subject matter.

Turning to FIG. 3, FIG. 3 illustrates a diagram of an example, non-limiting system 300 that can comprise a pair of TCQs that can manage interaction or coupling between qubits, in accordance with various aspects and embodiments of the disclosed subject matter. The system 300 can comprise a first qubit 302 and a second qubit 304 that can be formed as part of a quantum circuit, which can be formed on one or more chip stacks formed on one or more dies (e.g., IC chips). In certain embodiments, the first qubit 302 and second qubit 304 can be transmon qubits, although, in other embodiments, the first qubit 302 and second qubit 304 can be a different type of qubit. The first qubit 302 can comprise a JJ 306 and a capacitor 308, which can be in parallel with the JJ 306. The second qubit 304 can comprise a JJ 310 and a capacitor 312, which can be in parallel with the JJ 310.

The system 300 also can comprise a first TCQ 314 and second TCQ 316. The first qubit 302 can be associated with (e.g., coupled to) the first TCQ 314 via coupling capacitors 318 and 320. The second qubit 304 can be associated with (e.g., coupled to) the second TCQ 316 via coupling capacitors 322 and 324. The first TCQ 314 can be associated with (e.g., coupled to) the second TCQ 316 via coupling capacitor 326.

The first TCQ 314 can comprise a JJ 328 and SQUID 330, which can be associated with (e.g., connected to) the JJ 328. The SQUID 330 can comprise JJ 332 and JJ 334, which can be in parallel with the JJ 332. The SQUID 330 can be formed, in part, by respective currents that can flow through JJ 332 and JJ 334. The first TCQ 314 also can comprise a shunt capacitor 336, which can be in parallel with the JJ 328 and SQUID 330. The first TCQ 314 also can include a capacitor 338, which can be in parallel with the SQUID 330, and a capacitor 340, which can be in parallel with the JJ 328.

The second TCQ 316 can comprise a JJ 342 and SQUID 344, which can be associated with (e.g., connected to) the JJ 342. The SQUID 344 can comprise JJ 346 and JJ 348, which can be in parallel with the JJ 346. The SQUID 344 can be formed, in part, by respective currents that can flow through JJ 346 and JJ 348. The second TCQ 316 also can comprise a shunt capacitor 350, which can be in parallel with the JJ 342 and SQUID 344. The second TCQ 316 also can include a capacitor 352, which can be in parallel with the SQUID 344, and a capacitor 354, which can be in parallel with the JJ 342.

The first TCQ 314 can comprise a first mode (e.g., an "A" mode) associated with a first frequency and a second mode (e.g., an "B" mode) associated with a second frequency. The second TCQ 316 can comprise a third mode (e.g., another "B" mode) associated with a third frequency and a fourth mode (e.g., another "A" mode) associated with a fourth frequency. When a desired (e.g., suitable or appropriate) magnetic flux is applied to the SQUID 330 of the first TCQ 314 (e.g., by a coil component (not shown in FIG. 3; as described herein)), the first qubit 302 can couple to only the first mode (e.g., "A" mode) of the first TCQ 314. When a desired (e.g., suitable or appropriate) magnetic flux is applied to the SQUID 344 of the second TCQ 316 (e.g., by a coil component (not shown in FIG. 3; as described herein)), the second qubit 304 can couple to only the fourth mode (e.g., the other "A" mode) of the second TCQ 316. Under the same respective magnetic fields, the first TCQ 314 and the second TCQ 316 only can couple to each other via the second mode and the third mode (e.g., via their respective "B" modes). As a result, when the TCQs 314 and 316 are under the respective magnetic fields, there can be a balance between a first energy (e.g., first Josephson energy) associated with SQUID 330 and a second energy associated with JJ 328 (e.g., the first energy and second energy can be the same or substantially the same), there can be a balance between a third energy associated with SQUID 344 and a fourth energy associated with JJ 342, and, accordingly, interaction or coupling between the first qubit 302 and the second qubit 304 can be desirably suppressed, such as described herein.

When the respective magnetic fields applied to the first TCQ 314 and second TCQ 316 are modified to desired respective modified magnetic fields (e.g., by the respective coil components), this can create an imbalance between the first energy (e.g., as modified by the modified magnetic field) associated with the SQUID 330 and the second energy associated with the JJ 328, and can create an imbalance between the third energy (e.g., as modified by the other modified magnetic field) associated with the SQUID 344 and the fourth energy associated with the JJ 342. As a result, the respective modes of the first TCQ 314 and second TCQ 316 can be excited, and the mode-selective coupling of the first TCQ 314 and second TCQ 316 can be altered, such that the first qubit 302 can have desired interaction or coupling to both the first mode and second mode of the first TCQ 314, the second qubit 304 can have desired interaction or coupling to both the third mode and fourth mode of the second TCQ 316, and a desired interaction, coupling, and/or gate (e.g., ZZ interaction or coupling, exchange interaction or coupling, exchange gate, and/or CPHASE gate) can be created between the first qubit 302 and second qubit 304 via the first TCQ 314 and the second TCQ 316.

Figure 4:
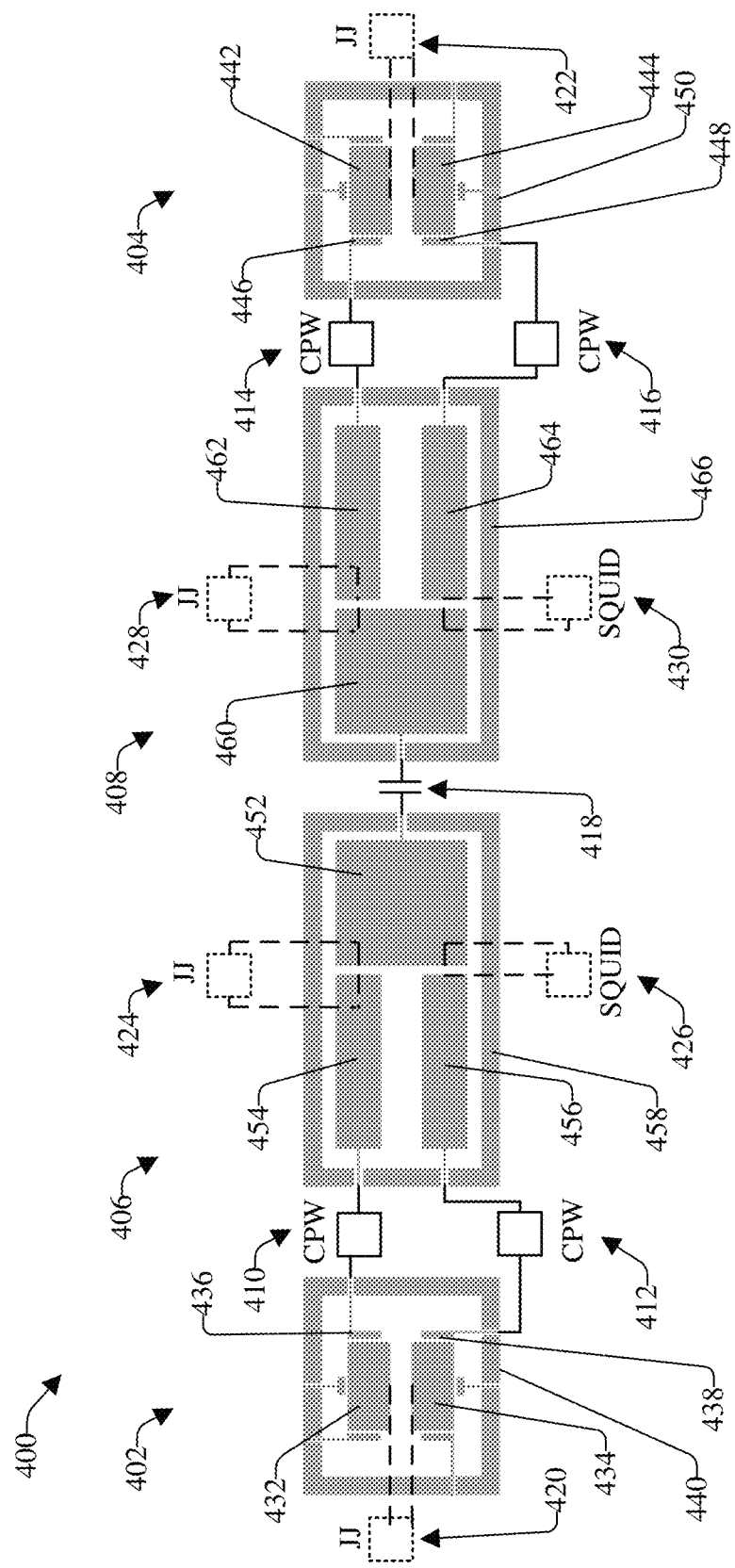
FIG. 4 depicts a diagram of an example, non-limiting device layout 400 of a system that can comprise a pair of tuneable coupler components that can manage interaction or coupling between qubits, in accordance with various aspects and embodiments of the disclosed subject matter.

Referring to FIG. 4, FIG. 4 depicts a diagram of an example, non-limiting device layout 400 (e.g., device geometry) of a system that can comprise a pair of TCQs that can manage interaction or coupling between qubits, in accordance with various aspects and embodiments of the disclosed subject matter. The device layout 400 of the system can comprise the layout of the quantum circuitry that can include a qubit 402, qubit 404, TCQ 406, TCQ 408, CPW 410, CPW 412, CPW 414, CPW 416, and coupling capacitor 418. The qubit 402 can comprise JJ 420. The qubit 404 can comprise JJ 422. The TCQ 406 can comprise JJ 424 and SQUID 426. The TCQ 408 can comprise JJ 428 and SQUID 430.

Each of the TCQs 406 and 408 can comprise respective "A" modes and respective "B" modes that can be associated with respective frequencies, such as described herein. Qubit 402 can be selectively coupled to TCQ 406 based on the "A" mode of TCQ 406, and qubit 404 can be selectively coupled to TCQ 408 based on the "A" mode of TCQ 408, such as described herein. TCQ 406 and TCQ 408 can be selectively coupled to each other based on their respective "B" modes, such as described herein.

As part of the device layout 400, the qubit 402 can be comprised of a group of pads (e.g., conductive and/or capacitive pads), including pad 432, pad 434, pad 436, and pad 438 that can be situated within and separated from a ground region 440. Also, as part of the device layout 400, the qubit 404 can be comprised of another group of pads, including pad 442, pad 444, pad 446, and pad 448 that can be situated within and separated from a ground region 450. Further, as part of the device layout 400, the TCQ 406 can be comprised of pads, including pad 452, pad 454, and pad 456 that can be situated within and separate from a ground region 458. Also, as part of the device layout 400, the TCQ 408 can be comprised of various pads, including pad 460, pad 462, and pad 464 that can be situated within and separate from a ground region 466.

The JJ 420 of qubit 402 can be connected to pad 432 and pad 434. The JJ 422 of qubit 404 can be connected to pad 442 and pad 444. With regard to the TCQ 406, the JJ 424 can be connected to pad 452 and pad 454, and the SQUID 426 can be connected to pad 452 and pad 456. With regard to the TCQ 408, the JJ 428 can be connected to pad 460 and pad 462, and the SQUID 430 can be connected to pad 460 and pad 464. The TCQ 406 and TCQ 408 can be selectively coupled to each other via the coupling capacitor 418.

The qubit 402 can be selectively coupled to TCQ 406, such as described herein. To facilitate such selective coupling, pad 436 of qubit 402 can be connected to CPW 410, and CPW 410 can be connected to pad 454 of TCQ 406, wherein pad 436 and pad 432 of qubit 402 can be capacitively associated or connected with each other. Also, to facilitate such selective coupling, pad 438 of qubit 402 can be connected to CPW 412, and CPW 412 can be connected to pad 456 of TCQ 406, wherein pad 438 and pad 434 of qubit 402 can be capacitively associated or connected with each other.

The qubit 404 can be selectively coupled to TCQ 408, such as described herein. To facilitate such selective coupling, pad 446 of qubit 404 can be connected to CPW 414, and CPW 414 can be connected to pad 462 of TCQ 408, wherein pad 446 and pad 442 of qubit 404 can be capacitively associated or connected with each other. Also, to facilitate such selective coupling, pad 448 of qubit 404 can be connected to CPW 416, and CPW 416 can be connected to pad 464 of TCQ 408, wherein pad 448 and pad 444 of qubit 404 can be capacitively associated or connected with each other.

The system represented by the device layout 400 can operate and/or function in a same or similar manner as other systems or devices described herein with regard to selective coupling, suppressing interactions or coupling between qubits when desired, and allowing interactions, coupling, or gates between qubits when desired. It is to be appreciated and understood that the example device layout 400 is merely one exemplary device layout of a system that can comprise a pair of TCQs that can be respectively associated with qubits to facilitate desired selective interactions or coupling of such qubits, and, in other embodiments, various other device layouts can be utilized to achieve the desired selective interactions or coupling of the qubits, in accordance with various aspects and embodiments of the disclosed subject matter.

Figure 5:
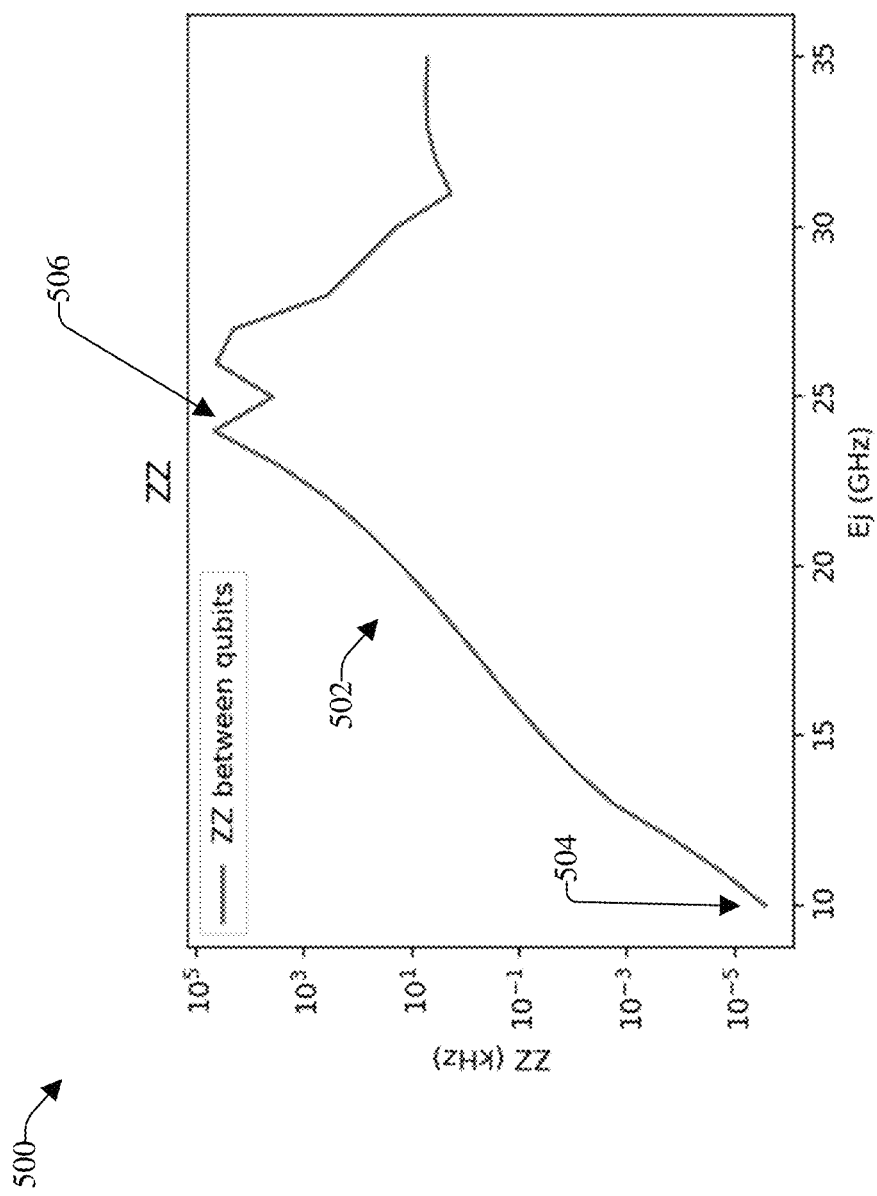
FIG. 5 presents a diagram of an example, non-limiting graph illustrating magnetic field tuning of ZZ interaction for a system that can comprise a pair of coupler components that can manage interaction or coupling between qubits, in accordance with various aspects and embodiments of the disclosed subject matter.

Turning briefly to FIG. 5 (along with FIG. 3), FIG. 5 presents a diagram of an example, non-limiting graph 500 illustrating magnetic field tuning of ZZ interaction for a system that can comprise a pair of coupler components that can manage interaction or coupling between qubits, in accordance with various aspects and embodiments of the disclosed subject matter. A coupling can be defined as an interaction between two systems (e.g., between a first system, comprising a first qubit and/or a first TCQ, and a second system, comprising a second qubit and/or a second TCQ) strong enough to create a multi-qubit gate (e.g., between two qubits) and/or a desired exchange of information or energy between two electronic elements (e.g., qubits, resonators, or other desired electronic elements or components). The example graph 500 can present ZZ interaction, in kilohertz (kHz), between the first qubit 302 and second qubit 304, along the y-axis of the graph 500, as a function of Josephson energy, $E_j$, in gigahertz (GHz), along the x-axis of the graph 500. The graph line 502 can present data points indicating the amount of ZZ interaction between the first qubit 302 and second qubit 304 for various Josephson energies, $E_j$, in an example scenario.

In this example scenario, the critical current associated with the JJ 328 of the first TCQ 314 and the critical current associated with the JJ 342 of the second TCQ 316 can be selected or set such that they both have Josephson energies, $E_j$=10 GHz. Also, in this example scenario, the frequencies associated with the first qubit 302 and second qubit 304 can be approximately 5 Ghz. The Josephson energies of SQUID 330 of the first TCQ 314 and SQUID 344 of the second TCQ 316 can be tuned (e.g., simultaneously or concurrently tuned, adjusted, or modified) via respective magnetic fluxes applied to the respective SQUIDs 330 and 344 (e.g., by respective coil components).

When the $E_j$ of each of the SQUIDs 330 and 344 are equal to 10 GHz, based on the respective magnetic fields applied to the SQUIDs 330 and 344 (e.g., by the respective coil components), ZZ and exchange interaction between the first qubit 302 and second qubit 304 can be desirably (e.g., suitably or heavily) suppressed, as indicated at reference numeral 504 of the graph 500. That is, the pair of TCQs 314 and 316 can effectively be in an off position or state where the ZZ and exchange interaction between the first qubit 302 and second qubit 304 can be suppressed.

When the $E_j$ of each of the SQUIDs 330 and 344 is increased towards approximately 25 GHz, based on the respective modified magnetic fields applied to the SQUIDs 330 and 344 (e.g., by the respective coil components), ZZ interaction between the first qubit 302 and second qubit 304 can be desirably (e.g., significantly or suitably) increased, achieving a ZZ>10 megahertz (MHz), as indicated at reference numeral 506 of the graph 500. Thus, when the $E_j$ of each of the SQUIDs 330 and 344 is increased to approximately 25 GHz, the pair of TCQs 314 and 316 can effectively be in an on position or state where the ZZ and exchange interaction between the first qubit 302 and second qubit 304 can be desirably increased.

Figure 6:
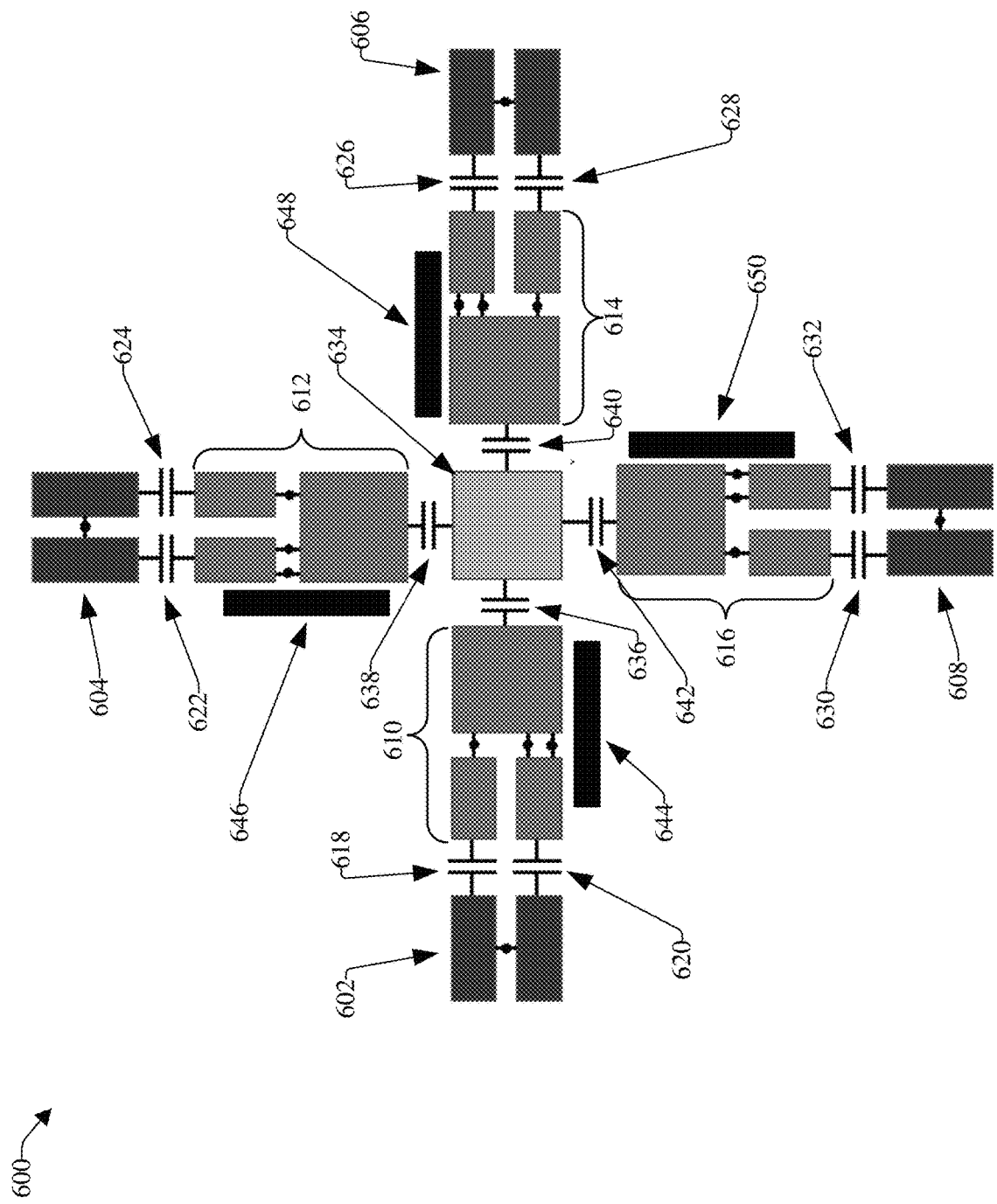
FIG. 6 illustrates a diagram of an example, non-limiting system that can couple multiple (e.g., four or more) coupler components via a capacitive or a co-planar waveguide (CPW) resonator bus component to provide enhanced connectivity between qubits and facilitate managing interaction or coupling between qubits, in accordance with various aspects and embodiments of the disclosed subject matter.

FIG. 6 illustrates a diagram of an example, non-limiting system 600 that can couple multiple (e.g., four or more) coupler components via a capacitive or CPW resonator bus component to provide enhanced connectivity between qubits and facilitate managing interaction or coupling between qubits, in accordance with various aspects and embodiments of the disclosed subject matter. Repetitive description of like elements employed in other embodiments described herein is or may be omitted for sake of brevity.

The example system 600 can comprise qubits 602, 604, 606, and 608. The example system 600 also can comprise TCQs 610, 612, 614, and 616. Each of the TCQs 610, 612, 614, and 616 can comprise an "A" mode of oscillation and a "B" mode of oscillation that can be associated with respective frequencies. It is to be appreciated and understood that, while the system 600 comprises four qubits and four TCQs, in other embodiments, the system 600 can comprise less than or more than four qubits, and less than or more than four TCQs.

The qubit 602 can be associated with (e.g., coupled to) the TCQ 610 via coupling capacitors 618 and 620. The qubit 604 can be associated with the TCQ 612 via coupling capacitors 622 and 624. The qubit 606 can be associated with the TCQ 614 via coupling capacitors 626 and 628. The qubit 608 can be associated with the TCQ 616 via coupling capacitors 630 and 632.

The system 600 can comprise a bus component 634 that can be employed to facilitate selective interaction or coupling between respective qubits (e.g., 602, 604, 606, or 608). In accordance with various embodiments, the bus component 634 can be a capacitive bus component or a CPW resonator bus component. The bus component 634 can be associated with (e.g., coupled to) the TCQ 610 via coupling capacitor 636, associated with the TCQ 612 via coupling capacitor 638, associated with the TCQ 614 via coupling capacitor 640, and associated with the TCQ 616 via coupling capacitor 642.

The respective qubits 602, 604, 606, and 608 can be selectively coupled to the respective TCQs 610, 612, 614, and 616 based on the respective "A" modes of the respective TCQs 610, 612, 614, and 616. The respective TCQs 610, 612, 614, and 616 can be selectively coupled to each other, based on the respective "B" modes of the respective TCQs 610, 612, 614, and 616, and via the bus component 634.

The system 600 also can comprise coil component 644 that can be located in proximity to the TCQ 610 (e.g., located in proximity to a SQUID (not shown in FIG. 6) of the TCQ 610), coil component 646 that can be located in proximity to the TCQ 612, coil component 648 that can be located in proximity to the TCQ 614, and coil component 650 that can be located in proximity to the TCQ 616. The respective coil components 644, 646, 648, and 650 can apply respective magnetic fluxes to the respective TCQs 610, 612, 614, and 616 based on respective input currents that can be supplied to the respective coil components 644, 646, 648, and 650, such as described herein.

For instance, if it is desired to suppress interaction and coupling between all of the qubits 602, 604, 606, and 608 associated with the bus component 634, the coil components 644, 646, 648, and 650 can apply respective magnetic fluxes to the respective TCQs 610, 612, 614, and 616 such that, for each TCQ, there can be a balance between a first Josephson energy associated with the SQUID of that TCQ and a second Josephson energy associated with the JJ of that TCQ (e.g., the first Josephson energy and second Josephson energy can be the same or substantially the same), and, accordingly, interaction or coupling between the qubits 602, 604, 606, and 608 can be desirably suppressed, such as described herein.

If it is desired to create an interaction, coupling, or gate between a pair of qubits connected to the same node (e.g., the same bus component 634), such interaction, coupling, or gate can be selectively implemented by the system 600 by flux-tuning only the TCQs associated with the pair of qubits to excite their respective "B" modes to transition those TCQs to an on state by modifying the respective magnetic fluxes applied to those TCQs, while leaving the other TCQs associated with the other qubits in an off state based on the respective magnetic fluxes applied to those other TCQs. For example, if it is desired to create an interaction, coupling, or gate between qubit 602 and qubit 604 associated with the bus component 634, while suppressing interaction with the other qubits 606 and 608 associated with the bus component 634, a first magnetic flux applied by the coil component 644 to the TCQ 610 can be modified to a first modified magnetic flux, based on a modified input current supplied to the coil component 644, to flux tune (e.g., to modify the tuning of) the SQUID of the TCQ 610, and a second magnetic flux applied by the coil component 646 to the TCQ 612 can be modified to a second modified magnetic flux, based on another modified input current supplied to the coil component 646, to flux tune the SQUID of the TCQ 612. The first modified magnetic flux can create an imbalance in Josephson energies between the SQUID and associated JJ of the TCQ 610, and the second modified magnetic flux can create an imbalance in Josephson energies between the SQUID and associated JJ of the TCQ 612, such as described herein. As a result, there can be a desired selective interaction, coupling, and/or gate (e.g., ZZ interaction and coupling, and/or entangling interaction and gate) between the qubit 602 and qubit 604 via the mode-selective coupling of the TCQ 610 and TCQ 612 (such as described herein), and via the bus component 634. The other magnetic fluxes applied to the other TCQs 614 and 616 by the other coil components 648 and 650 can remain as they were. As a result, interaction or coupling between the other qubits 606 and 608 associated with those other TCQs can be suppressed with regard to those qubits 606 and 608 as well as the qubits 602 and 604.

As another example, if it is desired to selectively create an interaction, coupling, or gate between qubit 604 and qubit 608 associated with the bus component 634, while suppressing interaction with the other qubits 602 and 606 associated with the bus component 634, the coil components 646 and 650 can be controlled to apply respective modified magnetic fluxes to the respective TCQs 612 and 616 to flux tune only TCQs 612 and 616 associated with qubits 604 and 608 to excite their respective "B" modes to transition those TCQs 612 and 616 to an on state and enable such interaction, coupling, or gate between qubit 604 and qubit 608. Meanwhile, the coil components 644 and 648 can continue to apply respective magnetic fluxes to the other TCQs 610 and 614 to maintain TCQs 610 and 614 in an off state (e.g., by maintaining their "B" modes in a non-excited state) and suppress interaction of the qubit 602 and qubit 606 with each other or with the other qubits 604 and 608. The system 600 can be utilized and managed to allow any desired selective interaction or coupling between any pair of qubits associated with the bus component 634, while suppressing interaction or coupling between the other qubits associated with the bus component 634.

Figure 7:
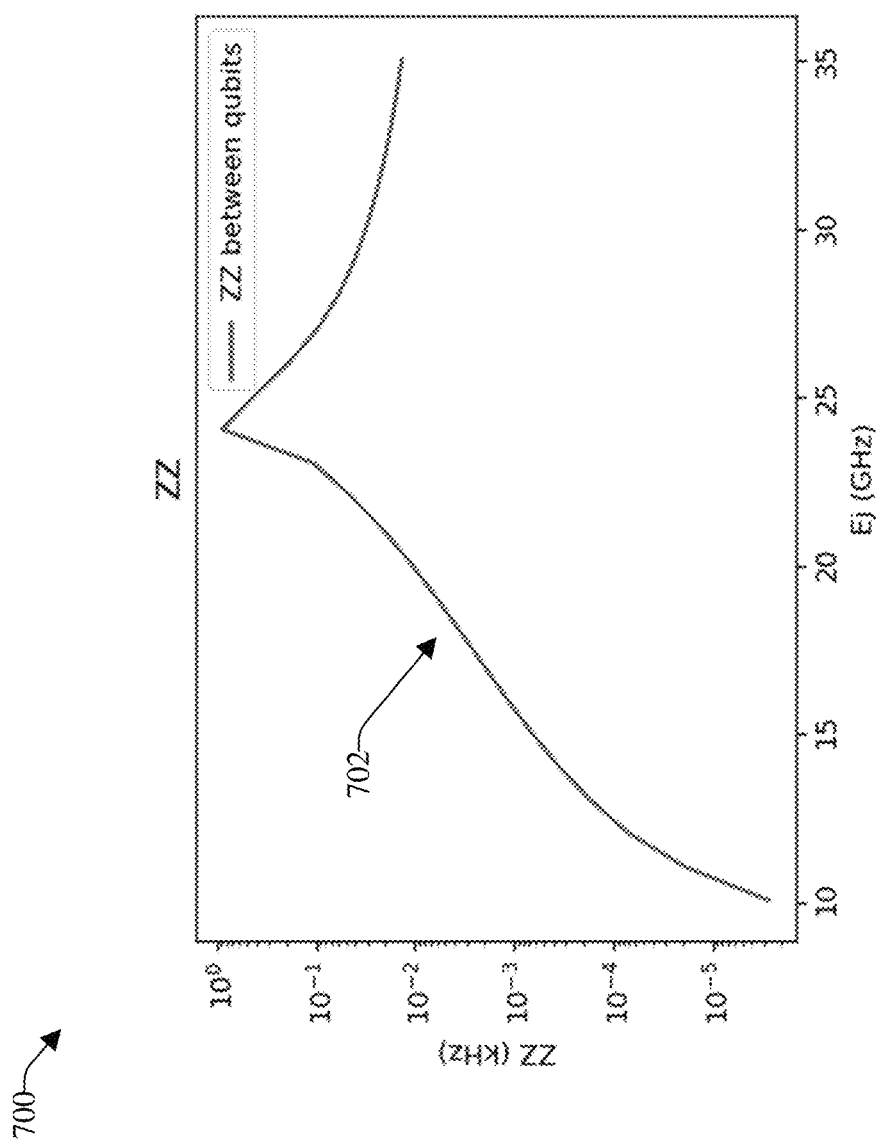
FIG. 7 presents a diagram of an example, non-limiting graph illustrating interaction between two qubits associated with respective tuneable coupler qubits (TCQs) associated with a node when one of the TCQs is flux tuned to transition that TCQ to an on state and the other TCQ is maintained in an off state, in accordance with various aspects and embodiments of the disclosed subject matter.

Referring briefly to FIG. 7 (along with FIG. 6), FIG. 7 presents a diagram of an example, non-limiting graph 700 illustrating interaction between two qubits associated with respective TCQs associated with a node (e.g., bus component) when one of the TCQs is flux tuned to transition that TCQ to an on state and the other TCQ is maintained in an off state, in accordance with various aspects and embodiments of the disclosed subject matter. The example graph 700 can present ZZ interaction, in kHz, between the qubit 602 and qubit 606, along the y-axis of the graph 700, as a function of Josephson energy, $E_j$, in GHz, along the x-axis of the graph 700. The graph line 702 can present data points indicating the amount of ZZ interaction between the qubit 602 and qubit 606 for various Josephson energies, $E_j$, in an example scenario.

In this example scenario, the TCQ 610 associated with the qubit 602 can be flux tuned to excite the "B" mode of TCQ 610 to transition it to an excited state to transition or place the TCQ 610 in the on state, while the TCQ 614 associated with the qubit 606 can remain in the off state. The Josephson energy, $E_j$, of the SQUID of TCQ 610 can be varied across a desired sweep range. The ZZ interaction between the qubit 602 and qubit 606 can be calculated. The graph line 702 can represent the calculated amount of ZZ interaction between the qubit 602 and qubit 606 for various Josephson energies, $E_j$. In the graph 700, it can be observed that ZZ<1 kHz for the entire sweep range, which can indicate a desirably minimal amount of unwanted entanglement between the qubit 602 and qubit 606.

Figure 8:
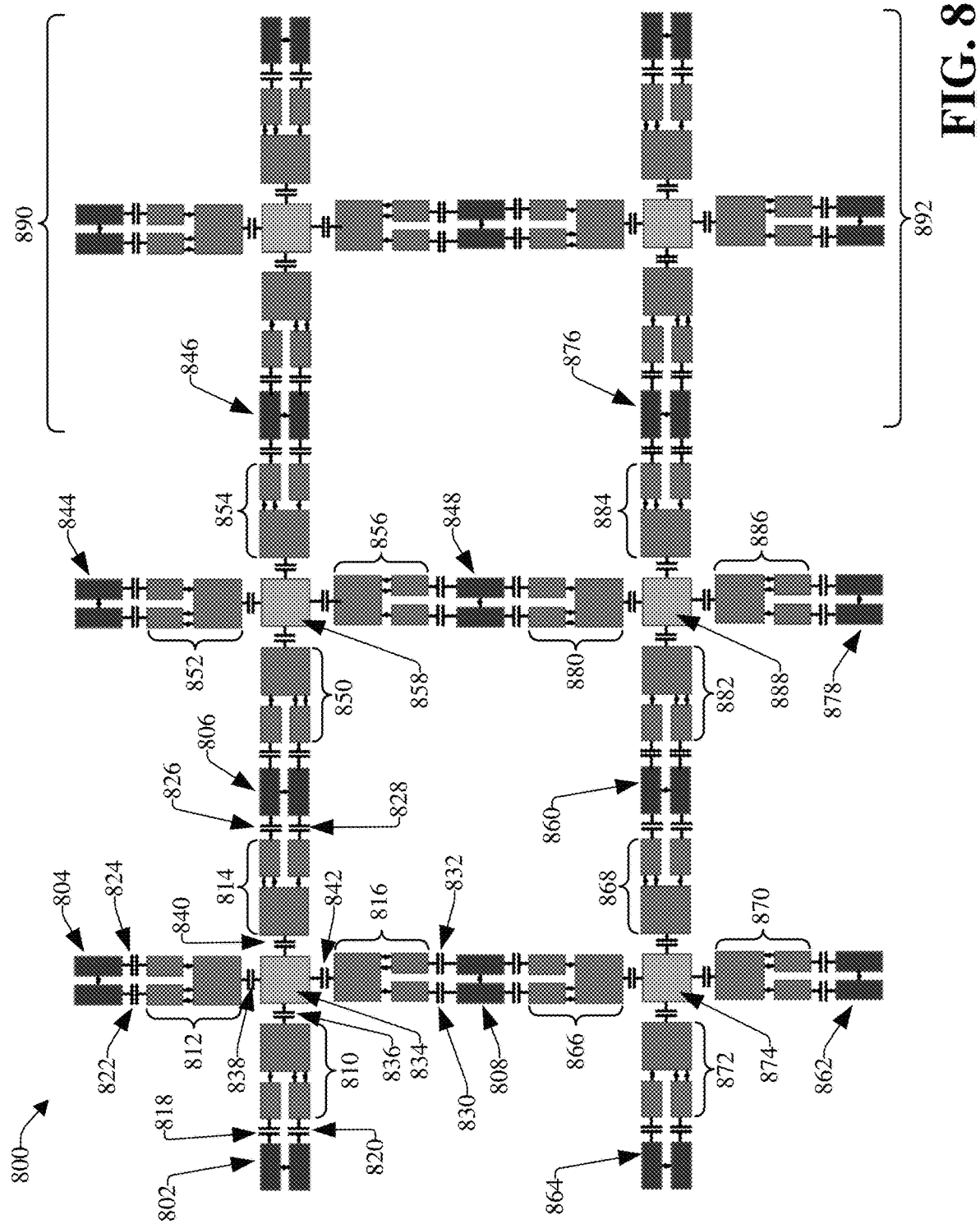
FIG. 8 illustrates a diagram of an example, non-limiting system that can comprise qubits and associated TCQs that can be associated with respective bus components to form a square lattice to provide enhanced connectivity between qubits and facilitate managing interaction or coupling between qubits, in accordance with various aspects and embodiments of the disclosed subject matter.

FIG. 8 illustrates a diagram of an example, non-limiting system 800 that can comprise qubits (e.g., transmon qubits) and associated TCQs that can be associated with respective bus components to form a square lattice to provide enhanced connectivity between qubits and facilitate managing interaction or coupling between qubits, in accordance with various aspects and embodiments of the disclosed subject matter. Repetitive description of like elements employed in other embodiments described herein is or may be omitted for sake of brevity.

The example system 800 can comprise, as part of the lattice comprising qubits, a first subgroup of qubits, which can include qubits 802, 804, 806, and 808. The example system 800 also can comprise TCQs 810, 812, 814, and 816. Each of the TCQs 810, 812, 814, and 816 can comprise an "A" mode of oscillation and a "B" mode of oscillation that can be associated with respective frequencies. The qubit 802 can be associated with (e.g., selectively coupled to) the TCQ 810 via coupling capacitors 818 and 820. The qubit 804 can be associated with the TCQ 812 via coupling capacitors 822 and 824. The qubit 806 can be associated with the TCQ 814 via coupling capacitors 826 and 828. The qubit 808 can be associated with the TCQ 816 via coupling capacitors 830 and 832.

The system 800 can comprise a bus component 834 that can be employed to facilitate selective interaction or coupling between respective qubits (e.g., 802, 804, 806, or 808). In accordance with various embodiments, the bus component 834 can be a capacitive bus component or a CPW resonator bus component. The bus component 834 can be associated with (e.g., coupled to) the TCQ 810 via coupling capacitor 836, associated with the TCQ 812 via coupling capacitor 838, associated with the TCQ 814 via coupling capacitor 840, and associated with the TCQ 816 via coupling capacitor 842.

The respective qubits 802, 804, 806, and 808 can be selectively coupled to the respective TCQs 810, 812, 814, and 816 based on the respective "A" modes of the respective TCQs 810, 812, 814, and 816, such as described herein. The respective TCQs 810, 812, 814, and 816 can be selectively coupled to each other, based on the respective "B" modes of the respective TCQs 810, 812, 814, and 816, and via the bus component 834, such as described herein.

The example system 800 also can comprise, as part of the lattice, a second subgroup of qubits, which can include qubits 806, 844, 846, and 848, that can be respectively associated with TCQs 850, 852, 854, and 856 (e.g., via respective coupling capacitors). As can be observed, in the lattice, qubit 806 can be part of the first subgroup of qubits and the second subgroup of qubits. That is, the qubit 806, and various other qubits of the lattice, each can be associated with two TCQs (e.g., qubit 806 can be selectively coupled to TCQ 814 and TCQ 850). The TCQs 850, 852, 854, and 856 can be associated with the bus component 858 (e.g., via respective coupling capacitors). It is to be appreciated and understood that this portion and other portions of the lattice associated with other subgroups of qubits also can comprise various other coupling capacitors to couple respective qubits to respective TCQs and couple respective TCQs to respective bus components; however, for reasons of brevity and clarity, such coupling capacitors are not numerically referenced in FIG. 8.

Each of the TCQs 850, 852, 854, and 856 can comprise an "A" mode of oscillation and a "B" mode of oscillation that can be associated with respective frequencies. The respective qubits 806, 844, 846, and 848 can be selectively coupled to the respective TCQs 850, 852, 854, and 856 based on the respective "A" modes of the respective TCQs 850, 852, 854, and 856, such as described herein. The respective TCQs 850, 852, 854, and 856 can be selectively coupled to each other, based on the respective "B" modes of the respective TCQs 850, 852, 854, and 856, and via the bus component 858, such as described herein.

The example system 800 also can comprise, as part of the lattice, a third subgroup of qubits, which can include qubits 808, 860, 862, and 864, that can be respectively associated with TCQs 866, 868, 870, and 872 (e.g., via respective coupling capacitors). As can be observed, in the lattice, qubit 808 can be part of the first subgroup of qubits and the third subgroup of qubits. The TCQs 866, 868, 870, and 872 can be associated with the bus component 874 (e.g., via respective coupling capacitors). Each of the TCQs 866, 868, 870, and 872 can comprise an "A" mode of oscillation and a "B" mode of oscillation that can be associated with respective frequencies. The respective qubits 808, 860, 862, and 864 can be selectively coupled to the respective TCQs 866, 868, 870, and 872 based on the respective "A" modes of the respective TCQs 866, 868, 870, and 872, such as described herein. The respective TCQs 866, 868, 870, and 872 can be selectively coupled to each other, based on the respective "B" modes of the respective TCQs 866, 868, 870, and 872, and via the bus component 874, such as described herein.

The example system 800 also can comprise, as part of the lattice, a fourth subgroup of qubits, which can include qubits 848, 860, 876, and 878, that can be respectively associated with TCQs 880, 882, 884, and 886 (e.g., via respective coupling capacitors). As can be observed, in the lattice, qubit 848 can be part of the second subgroup of qubits and the fourth subgroup of qubits, and qubit 860 can be part of the third subgroup of qubits and the fourth subgroup of qubits. The TCQs 880, 882, 884, and 886 can be associated with the bus component 888 (e.g., via respective coupling capacitors). Each of the TCQs 880, 882, 884, and 886 can comprise an "A" mode of oscillation and a "B" mode of oscillation that can be associated with respective frequencies. The respective qubits 848, 860, 876, and 878 can be selectively coupled to the respective TCQs 880, 882, 884, and 886 based on the respective "A" modes of the respective TCQs 880, 882, 884, and 886, such as described herein. The respective TCQs 880, 882, 884, and 886 can be selectively coupled to each other, based on the respective "B" modes of the respective TCQs 880, 882, 884, and 886, and via the bus component 888, such as described herein.

Similarly, in some embodiments, the example system 800 further can comprise, as part of the lattice, a fifth subgroup of qubits 890 (which can include qubit 846 that also is part of the second subgroup of qubits), wherein respective qubits of the fifth subgroup 890 can be associated with respective TCQs that can be associated with a bus component; a sixth subgroup of qubits 892 (which can include qubit 876 that also is part of the fourth subgroup of qubits), wherein respective qubits of the sixth subgroup 892 can be associated with respective TCQs that can be associated with a bus component; and/or another subgroup(s) of qubits, associated TCQs, and associated bus component.

If it is desired to suppress interaction between all of the qubits (e.g., qubits 802, 804, 806, 808, 844, 846, 848, ..., 860, ..., 876, 878, 880) of the lattice, respective magnetic fields can be applied (e.g., by respective coil components) to the respective TCQs (e.g., TCQs 810, 812, 814, 816, 850, 852, 854, 856, 866, ..., 880, 882, 884, 886) associated with the respective qubits of the lattice to place the respective TCQs in an off state, such as described herein. The system 800 also can implement selective interaction or coupling between one or more desired pairs of qubits (e.g., qubit 802 and qubit 806; and/or qubit 844 and qubit 846; and/or qubit 848 and qubit 860) of the lattice by flux-tuning only the TCQs (e.g., TCQ 810 and TCQ 814; and/or TCQ 852 and TCQ 854; and/or TCQ 882 and TCQ 880, respectively) associated with the one or more desired pairs of qubits by modifying the respective magnetic fluxes applied to those TCQs (e.g., by the respective coil components associated with those TCQs) to flux tune those TCQs to excite the respective "B" modes of only those TCQs to transition them to an excited state to transition those TCQs from an off state to an on state, while leaving the other TCQs associated with the other qubits in an off state based on the respective magnetic fluxes applied to those other TCQs associated with the lattice, such as described herein. It is to be appreciated and understood that, for reasons of brevity and clarity, the respective coil components associated with the respective TCQs (e.g., TCQs 810, 812, 814, 816, 850, 852, 854, 856, 866, ..., 880, 882, 884, 886) are not shown in FIG. 8.

Figure 9:
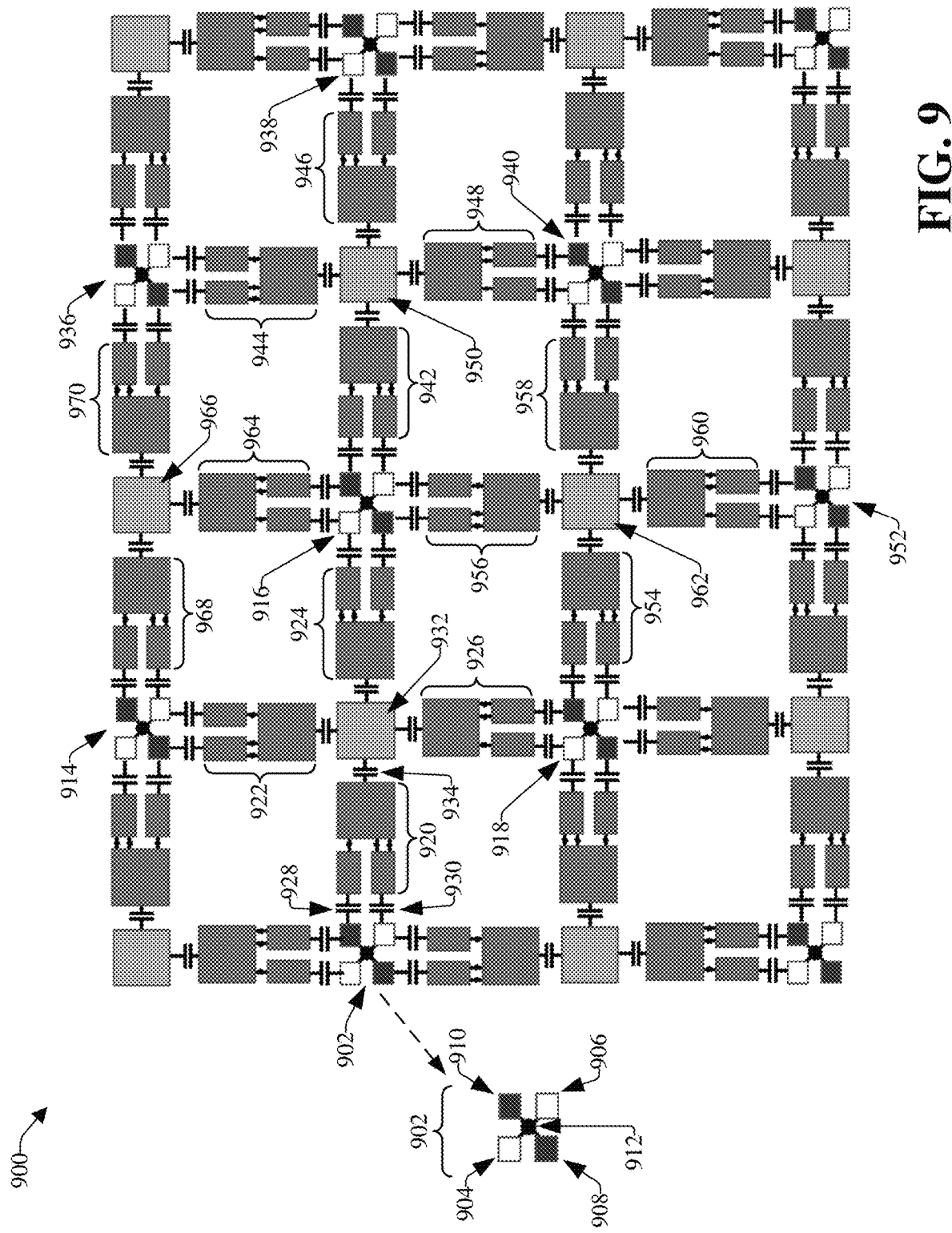
FIG. 9 depicts a diagram of an example, non-limiting system that can comprise quadrupole transmon qubits (QTQs) and associated TCQs that can be associated with respective bus components to form a square lattice to provide enhanced connectivity between such qubits and facilitate managing interaction or coupling between such qubits, in accordance with various aspects and embodiments of the disclosed subject matter.

FIG. 9 depicts a diagram of an example, non-limiting system 900 that can comprise quadrupole transmon qubits and associated TCQs that can be associated with respective bus components to form a square lattice (e.g., a desirably dense square lattice) to provide enhanced connectivity between such qubits and facilitate managing interaction or coupling between such qubits, in accordance with various aspects and embodiments of the disclosed subject matter. The system 900 also can have desirably increased density of components (e.g., increased number of quantum components on a die), as compared to existing quantum circuitry and techniques. Repetitive description of like elements employed in other embodiments described herein is or may be omitted for sake of brevity.

The lattice of the system 900 can comprise a group of quadrupole transmon qubits, including quadrupole transmon qubit (QTQ) 902. QTQ 902 (as well as each of the other QTQs) can comprise four capacitor pads, including capacitor pads 904, 906, 908, and 910, and a JJ 912. Capacitor pad 904 and capacitor pad 906 can be galvanically connected to each other, and capacitor pad 908 and capacitor pad 910 can be galvanically connected to each other. The JJ 912 can be associated with (e.g., connected to) the capacitor pads 904, 906, 908, and 910. The JJ 912 can facilitate (e.g., enable) connecting capacitor pads 904 and 906 to capacitor pads 908 and 910 under certain conditions. The QTQ 902 can function like a transmon qubits, such as described herein, except that, with the capacitor pad arrangement in relation to the JJ 912 of the QTQ 902, the QTQ 902 can have a dipole interaction with up to four TCQs, instead of only up to two TCQs.

The example system 900 can comprise, as part of the lattice (e.g., square lattice), a first subgroup of QTQs, which can include QTQs 902, 914, 916, and 918. The example system 900 also can comprise TCQs 920, 922, 924, and 926. Each of the TCQs 920, 922, 924, and 926 can comprise an "A" mode of oscillation and a "B" mode of oscillation that can be associated with respective frequencies. The QTQ 902 can be associated with (e.g., selectively coupled to) the TCQ 920 (e.g., via coupling capacitors). The QTQ 914 can be associated with the TCQ 922 (e.g., via coupling capacitors). The QTQ 916 can be associated with the TCQ 924 (e.g., via coupling capacitors). The QTQ 918 can be associated with the TCQ 926 (e.g., via coupling capacitors). As disclosed, each of QTQs (e.g., QTQ 902) can be associated with one or more TCQs (e.g., TCQ 920) via coupling capacitors (e.g., coupling capacitors 928 and 930). For reasons of brevity and clarity, in FIG. 9, only some of the coupling capacitors are explicitly referenced using reference numerals.

The system 900 can comprise a bus component 932 that can be employed to facilitate selective interaction or coupling between respective QTQs 902, 914, 916, and 918 respectively associated with the bus component 932 via the respective TCQs 920, 922, 924, and 926. In accordance with various embodiments, the bus component 932 can be a capacitive bus component or a CPW resonator bus component. The bus component 932 can be associated with (e.g., coupled to) the TCQs 920, 922, 924, and 926 via respective coupling capacitors (e.g., coupling capacitor 934).

The respective QTQs 902, 914, 916, and 918 can be selectively coupled to the respective TCQs 920, 922, 924, and 926 based on the respective "A" modes of the respective TCQs 920, 922, 924, and 926, such as described herein. The respective TCQs 920, 922, 924, and 926 can be selectively coupled to each other, based on the respective "B" modes of the respective TCQs 920, 922, 924, and 926, and via the bus component 932, such as described herein.

The example system 900 also can comprise, as part of the lattice, a second subgroup of QTQs, which can include QTQs 916, 936, 938, and 940, that can be respectively associated with TCQs 942, 944, 946, and 948 (e.g., via respective coupling capacitors). As can be observed, in the lattice, QTQ 916 can be part of the first subgroup of QTQs and the second subgroup of QTQs. The TCQs 942, 944, 946, and 948 can be associated with the bus component 950 (e.g., via respective coupling capacitors). Each of the TCQs 942, 944, 946, and 948 can comprise an "A" mode of oscillation and a "B" mode of oscillation that can be associated with respective frequencies. The respective QTQs 916, 936, 938, and 940 can be selectively coupled to the respective TCQs 942, 944, 946, and 948 based on the respective "A" modes of the respective TCQs 942, 944, 946, and 948, such as described herein. The respective TCQs 942, 944, 946, and 948 can be selectively coupled to each other, based on the respective "B" modes of the respective TCQs 942, 944, 946, and 948, and via the bus component 950, such as described herein.

The example system 900 also can comprise, as part of the lattice, a third subgroup of QTQs, which can include QTQs 916, 918, 940 and 952, that can be respectively associated with TCQs 954, 956, 958, and 960 (e.g., via respective coupling capacitors). As can be observed, in the lattice, QTQ 916 can be part of the first, second, and third subgroups of QTQs, QTQ 918 can be part of the first and third subgroups of QTQs, and QTQ 940 can be part of the second and third subgroups of TCQs. The TCQs 954, 956, 958, and 960 can be associated with the bus component 962 (e.g., via respective coupling capacitors). Each of the TCQs 954, 956, 958, and 960 can comprise an "A" mode of oscillation and a "B" mode of oscillation that can be associated with respective frequencies. The respective QTQs 916, 918, 940 and 952 can be selectively coupled to the respective TCQs 954, 956, 958, and 960 based on the respective "A" modes of the respective TCQs 954, 956, 958, and 960, such as described herein. The respective TCQs 954, 956, 958, and 960 can be selectively coupled to each other, based on the respective "B" modes of the respective TCQs 954, 956, 958, and 960, and via the bus component 962, such as described herein.

The lattice also can comprise other subgroups of QTQs, wherein each subgroup of QTQs can comprise respective QTQs that can be associated with respective TCQs that can be associated a bus component. As disclosed, given the structure and characteristics of a QTQ, a QTQ (e.g., QTQ 916) can have a dipole interaction with up to four TCQs, instead of only up to two TCQs. For example, with regard to QTQ 916, in addition to the QTQ 916 being associated with (e.g., selectively coupled to) TCQ 924, TCQ 942, and TCQ 956, the QTQ 916 also can be associated with a fourth TCQ, the TCQ 964 (e.g., via coupling capacitors). The TCQ 964 can be associated with bus component 966 (e.g., via a coupling capacitor).

Also, QTQ 914 can be associated with a TCQ 968 (e.g., via coupling capacitors), wherein the TCQ 968 can be associated with the bus component 966 (e.g., via a coupling capacitor). QTQ 936 can be associated with a TCQ 970 (e.g., via coupling capacitors), wherein the TCQ 970 can be associated with the bus component 966 (e.g., via a coupling capacitor).

As a result, with the QTQ 916 being associated with four TCQs (e.g., 924, 942, 956, and 964) that can be associated with four bus components (e.g., 932, 950, 962, and 966), the QTQ 916 can selectively interact with (e.g., can be selectively coupled to) seven or more QTQs (e.g., QTQs 902, 914, 918, 936, 938, 940, and 952, and/or another QTQ if the lattice is extended). Also, in some embodiments, if a pair of QTQs (e.g., QTQs 902 and 914) associated with one bus component (e.g., bus component 932) are interacting with each other because their associated TCQs (e.g., TCQs 920 and 926) are switched to the on state (e.g., based on modified magnetic fluxes being applied thereto), if desired, the QTQ 916 can concurrently or simultaneously interact with QTQ 918 via bus component 962 by switching their associated TCQs (e.g., TCQs 956 and 954) to the on state, even though QTQs 902, 914, 916, and 918 are all associated with the bus component 932.

If it is desired to suppress interaction between all of the QTQs (e.g., QTQs 902, 914, 916, 918, 936, 938, 940, and 952, and other QTQs) of the lattice, respective magnetic fields can be applied (e.g., by respective coil components) to the respective TCQs (e.g., TCQs 920, 922, 924, 926, 942, 944, 946, 948, 954, 956, 958, 960, 964, 968, and 970, and other TCQs) associated with the respective QTQs of the lattice to place the respective TCQs in an off state, such as described herein. The system 900 also can implement selective interaction or coupling between one or more desired pairs of QTQs (e.g., QTQ 902 and QTQ 914; and/or QTQ 916 and QTQ 938; and/or QTQ 940 and QTQ 952) of the lattice by flux-tuning only the TCQs (e.g., TCQ 920 and TCQ 922; and/or TCQ 942 and TCQ 946; and/or TCQ 958 and TCQ 960, respectively) associated with the one or more desired pairs of QTQs by modifying the respective magnetic fluxes applied to those TCQs (e.g., by the respective coil components associated with those TCQs) to flux tune those TCQs to excite the respective "B" modes of only those TCQs to transition them to an excited state to transition those TCQs from an off state to an on state, while leaving the other TCQs associated with the other qubits in an off state based on the respective magnetic fluxes applied to those other TCQs associated with the lattice, such as described herein.

It is to be appreciated and understood that, for reasons of brevity and clarity, the respective coil components associated with the respective TCQs (e.g., TCQs 920, 922, 924, 926, 942, 944, 946, 948, 954, 956, 958, 960, 964, 968, and 970) are not shown in FIG. 9. It also is to be appreciated and understood that the lattice of the system 900 can be extended further in any direction, or even across multiple dies (e.g., via CPW resonators that can enable desirably long-range coupling), to allow for more QTQs, TCQs, and bus components, in accordance with the disclosed subject matter.

Figure 10:
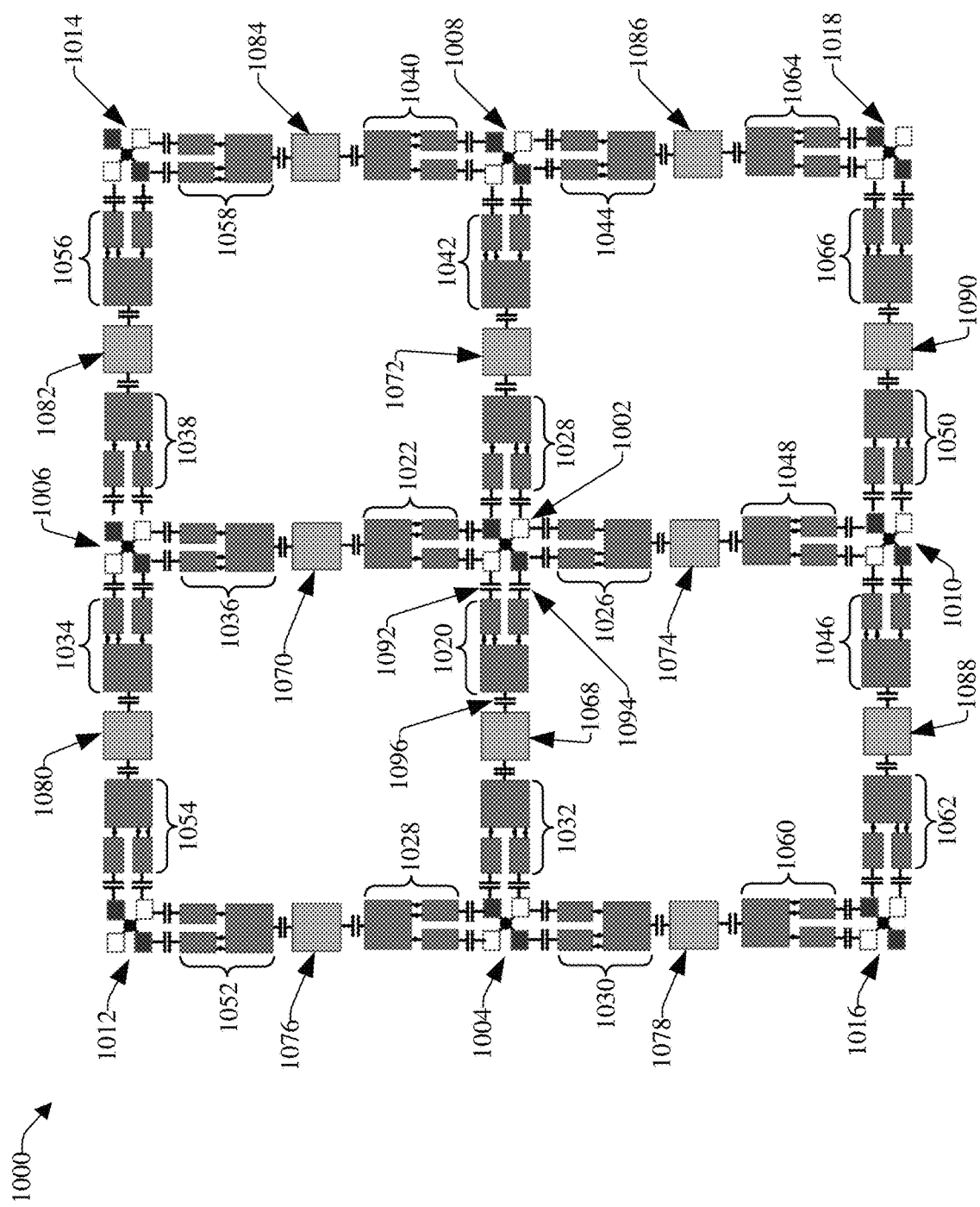
FIG. 10 illustrates a diagram of another example, non-limiting system that can comprise QTQs and associated TCQs that can be associated with respective bus components to form a square lattice to provide enhanced connectivity between such QTQs and facilitate managing interaction or coupling between such QTQs, in accordance with various aspects and embodiments of the disclosed subject matter.

FIG. 10 illustrates a diagram of another example, non-limiting system 1000 that can comprise QTQs and associated TCQs that can be associated with respective bus components to form a square lattice to provide enhanced connectivity between such QTQs and facilitate managing interaction or coupling between such QTQs, in accordance with various aspects and embodiments of the disclosed subject matter. Repetitive description of like elements employed in other embodiments described herein is or may be omitted for sake of brevity.

The lattice of the system 1000 can comprise a group of QTQs, including QTQs 1002, 1004, 1006, 1008, 1010, 1012, 1014, 1016, and 1018. A difference between the lattice of the system 1000 of FIG. 10, and the lattice of the system 900 of FIG. 9 is that the lattice of the system 900 can have increased density (e.g., can comprise more QTQs in the same amount of space on a die) as compared to the lattice of the system 1000.

The example system 1000 also can comprise TCQs 1020, 1022, 1024, 1026, 1028, 1030, 1032, 1034, 1036, 1038, 1040, 1042, 1044, 1046, 1048, 1050, 1052, 1054, 1056, 1058, 1060, 1062, 1064, and 1066. Each of the TCQs (e.g., 1020 through 1066) can comprise an "A" mode of oscillation and a "B" mode of oscillation that can be associated with respective frequencies. The example system 1000 further can comprise bus components 1068, 1070, 1072, 1074, 1076, 1078, 1080, 1082, 1084, 1086, 1088, and 1090.

The respective QTQs (e.g., 1002 through 1018) can be selectively coupled to the respective TCQs (e.g., 1020 through 1066) based on the respective "A" modes of the respective TCQs, such as described herein. The respective TCQs (e.g., 1020 through 1066) can be selectively coupled to each other, based on the respective "B" modes of the respective TCQs, and via the respective bus components (e.g., 1068 through 1090), such as described herein.

The respective QTQs (e.g., 1002 through 1018) can be associated with (e.g., selectively coupled to) respective TCQs (e.g., 1020 through 1066), for example, via respective coupling capacitors, such as shown in the system 1000 of FIG. 10. The respective TCQs (e.g., 1020 through 1066) can be coupled to respective bus components (e.g., 1068 through 1099), for example, via respective coupling capacitors, such as shown in the system 1000 of FIG. 10. For example, QTQ 1002 can be associated with (e.g., selectively coupled to) TCQs 1020, 1022, 1024, and 1026 via respective coupling capacitors (e.g., QTQ can be associated with TCQ 1020 via coupling capacitors 1092 and 1094). The TCQs 1020, 1022, 1024, and 1026 can be associated with respective bus components 1068, 1070, 1072, and 1074 via respective coupling capacitors (e.g., TCQ 1020 can be associated with bus component 1068 via coupling capacitor 1096). For reasons of brevity and clarity, in FIG. 10, only some of the coupling capacitors are explicitly referenced using reference numerals.

Also, the QTQ 1004 can be associated with the TCQ 1032 (e.g., via coupling capacitors), and the TCQ 1032 can be associated with the bus component 1068 (e.g., via a coupling capacitor). The QTQ 1006 can be associated with the TCQ 1036 (e.g., via coupling capacitors), and the TCQ 1036 can be associated with the bus component 1070 (e.g., via a coupling capacitor). The QTQ 1008 can be associated with the TCQ 1042 (e.g., via coupling capacitors), and the TCQ 1042 can be associated with the bus component 1072 (e.g., via a coupling capacitor). The QTQ 1010 can be associated with the TCQ 1048 (e.g., via coupling capacitors), and the TCQ 1048 can be associated with the bus component 1074 (e.g., via a coupling capacitor).

The system 1000, employing subgroups of TCQs associated with respective bus components, can desirably manage interactions and couplings between QTQs. For instance, if it is desired to suppress interaction between all of the QTQs (e.g., 1002 through 1018) of the lattice of the system 1000, respective magnetic fields can be applied (e.g., by respective coil components) to the respective TCQs (e.g., 1020 through 1066) associated with the respective QTQs of the lattice to place the respective TCQs in an off state, such as described herein. The system 1000 also can implement desired selective interaction or coupling between one or more desired pairs of QTQs (e.g., QTQ 1002 and QTQ 1004; and/or QTQ 1010 and QTQ 1018; and/or another pair of QTQs) of the lattice by flux-tuning only the TCQs (e.g., TCQ 1020 and TCQ 1032; and/or TCQ 1050 and TCQ 1066; and/or another pair of TCQs, respectively) associated with the one or more desired pairs of QTQs to transition those TCQs from an off state to an on state by modifying the respective magnetic fluxes applied to those TCQs (e.g., by the respective coil components associated with those TCQs), while leaving the other TCQs associated with the other qubits in an off state based on the respective magnetic fluxes applied to those other TCQs associated with the lattice, such as described herein.

It is to be appreciated and understood that, for reasons of brevity and clarity, the respective coil components associated with the respective TCQs (e.g., 1020 through 1066) are not shown in FIG. 9. It also is to be appreciated and understood that the lattice of the system 1000 can be extended further in any direction, or even across multiple dies (e.g., via CPW resonators that can enable desirably long-range coupling), to allow for more QTQs, TCQs, and bus components, in accordance with the disclosed subject matter.

Figure 11:
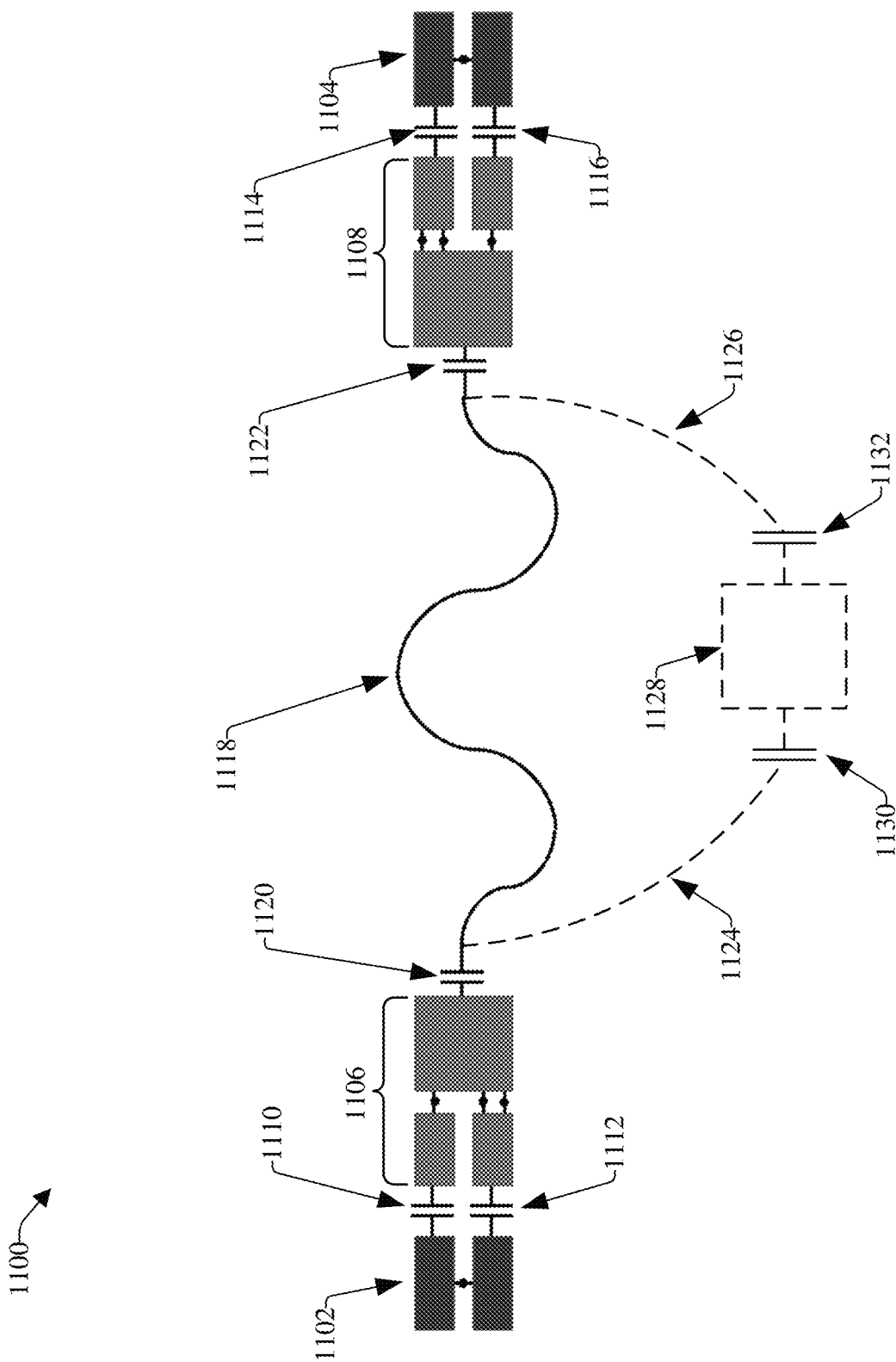
FIG. 11 depicts a block diagram of an example, non-limiting system that can employ a CPW resonator(s) that can enable long-range (e.g., long-distance) coupling between TCQs and/or between a TCQ and a bus component, in accordance with various aspects and embodiments of the disclosed subject matter.

FIG. 11 depicts a block diagram of an example, non-limiting system 1100 that can employ a CPW resonator(s) that can enable long-range (e.g., long-distance) coupling between TCQs and/or between a TCQ and a bus component, in accordance with various aspects and embodiments of the disclosed subject matter. Repetitive description of like elements employed in other embodiments described herein is or may be omitted for sake of brevity.

The system 1100 can comprise a qubit 1102 and qubit 1104, TCQ 1106 and TCQ 1108. The qubit 1102 can be associated with the TCQ 1106 via coupling capacitors 1110 and 1112. The qubit 1104 can be associated with the TCQ 1108 via coupling capacitors 1114 and 1116. Each of the TCQs 1106 and 1108 can comprise an "A" mode of oscillation and a "B" mode of oscillation that can be associated with respective frequencies. The qubit 1102 can be selectively coupled to the TCQ 1106 based on the "A" mode of the TCQ 1106, and the qubit 1104 can be selectively coupled to the TCQ 1108 based on the "A" mode of the TCQ 1108, such as described herein. The TCQs 1106 and 1108 can be selectively coupled to each other, based on the respective "B" modes of TCQs 1106 and 1108 (and via a CPW resonator 1118), such as described herein.

In some embodiments, the system 1100 can facilitate desirable long-range coupling (e.g., selective coupling) between the TCQ 1106 and TCQ 1108 across the same die (e.g., IC or qubit chip) or between two dies using a CPW resonator 1118 of a desired length (e.g., a desirably long length that can be on the order of millimeters in length) and having a desired resonance (e.g., approximately 5 GHz or other desired resonant frequency). The CPW resonator 1118 can act as a bus between the TCQ 1106 and TCQ 1108. In certain embodiments, the TCQ 1106 can be coupled to the CPW resonator 1118 via coupling capacitor 1120, and the TCQ 1108 can be coupled to the CPW resonator 1118 via coupling capacitor 1122.

In accordance with various embodiments, the TCQs 1106 and 1108 can be coupled to either the fundamental mode of the CPW resonator 1118 (e.g., a 5 GHz CPW resonator or a CPW resonator having a fundamental mode associated with a frequency greater than or less than 5 GHz), or a higher mode when the CPW resonator 1118 is relatively longer in length. In some embodiments, the length of the CPW resonator 1118 can be adjusted such that the higher mode of the CPW resonator 1118 also can be approximately 5 GHz or another desired frequency greater than or less than 5 GHz.

In other embodiments, one or both of the TCQs 1106 and/or 1108 can be selectively coupled to each other via one or more CPW resonators 1124 and/or 1126 that can be associated with a bus component 1128 via one or more respective coupling capacitors 1130 and/or 1132. In still other embodiments, a qubit (e.g., qubit 1102) can be selectively coupled to a TCQ (e.g., TCQ 1106) via CPW resonators of a desired length and resonance and via coupling capacitors that can be logically and/or physically situated between the qubit and the TCQ.

Interactions and coupling between the qubit 1102 and qubit 1104 can be selectively implemented or engaged via the TCQs 1106 and 1108, and via the CPW resonator(s) (e.g., CPW resonator 1118), based on respective magnetic fluxes or respective modified magnetic fluxes applied to the respective TCQs 1106 and 1108 (e.g., by respective coil components), such as more fully described herein.

Figure 12:
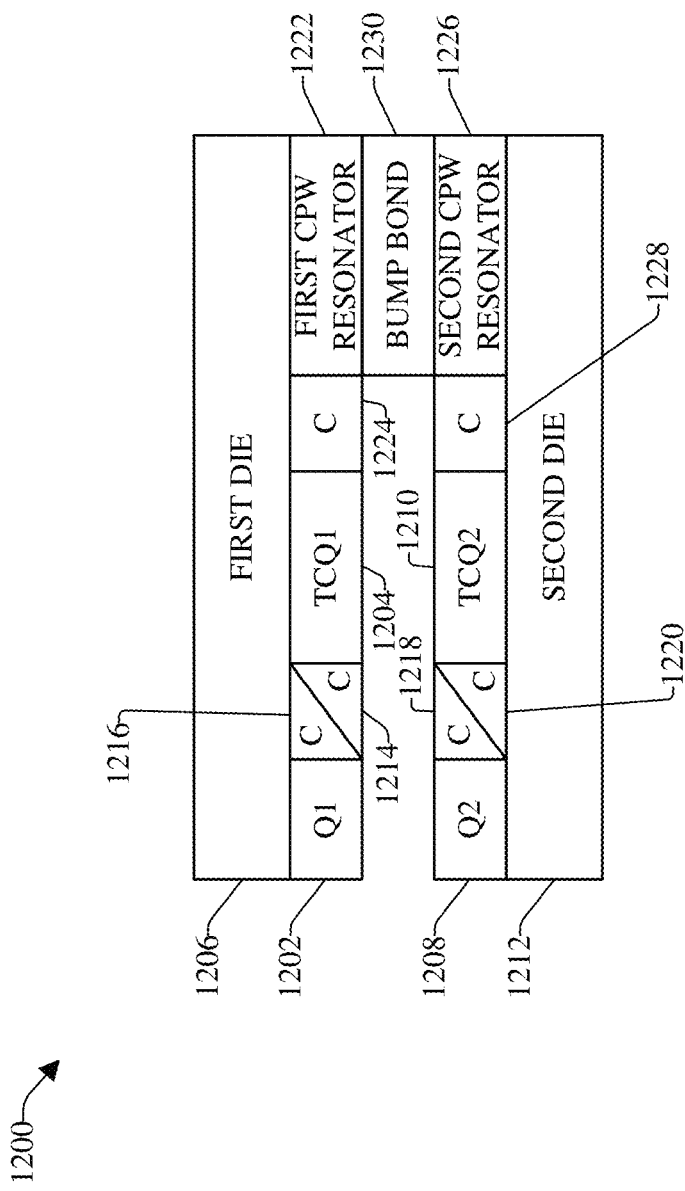
FIG. 12 illustrates a block diagram of an example, non-limiting system that can employ a CPW resonator that can enable long-range coupling between TCQs across multiple dies, in accordance with various aspects and embodiments of the disclosed subject matter.

FIG. 12 illustrates a block diagram of an example, non-limiting system 1200 that can employ a CPW resonator that can enable long-range (e.g., long-distance) coupling between TCQs across multiple dies, in accordance with various aspects and embodiments of the disclosed subject matter. Repetitive description of like elements employed in other embodiments described herein is or may be omitted for sake of brevity.

The system 1200 can comprise a first qubit (Q1) 1202 and first TCQ (TCQ1) 1204 that can be formed on a first die 1206. The system 1200 also can comprise a second qubit (Q2) 1208 and second TCQ (TCQ2) 1210 that can be formed on a second die 1212. The first qubit 1202 can be associated with the first TCQ 1204 via coupling capacitors (C) 1214 and 1216. The second qubit 1208 can be associated with the second TCQ 1210 via coupling capacitors 1218 and 1220. Each of the TCQs 1204 and 1210 can comprise an "A" mode of oscillation and a "B" mode of oscillation that can be associated with respective frequencies. The first qubit 1202 can be selectively coupled to the first TCQ 1204 based on the "A" mode of the first TCQ 1204, and the second qubit 1208 can be selectively coupled to the second TCQ 1210 based on the "A" mode of the second TCQ 1210, such as described herein. The TCQs 1204 and 1210 can be selectively coupled to each other, based on the respective "B" modes of TCQs 1204 and 1210 (and via CPW resonators), such as described herein.

In some embodiments, the system 1200 can comprise a first CPW resonator 1222 that can be situated or formed on the first die 1206. The first CPW resonator 1222 can be coupled to the first TCQ 1204 via a coupling capacitor 1224. The first CPW resonator 1222 can have a desired length and resonance (e.g., resonant frequency), such as described herein. The first TCQ 1204 can be coupled to the first CPW resonator 1222 via the fundamental mode or higher mode of the first CPW resonator 1222, wherein the fundamental mode or higher mode can be associated with a desired frequency.

In certain embodiments, the system 1200 can comprise a second CPW resonator 1226 that can be situated or formed on the second die 1212. The second CPW resonator 1226 can be coupled to the second TCQ 1210 via a coupling capacitor 1228. The second CPW resonator 1226 can have a desired length and resonance (e.g., resonant frequency), such as described herein. The second TCQ 1210 can be coupled to the second CPW resonator 1226 via the fundamental mode or higher mode of the second CPW resonator 1226, wherein the fundamental mode or higher mode can be associated with a desired frequency.

In some embodiments, the system 1200 can comprise a bump bond 1230 that can span from the first die 1206 to the second die 1212. The bump bond 1230 can be connected to the first CPW resonator 1222 and the second CPW resonator 1226 to connect the first CPW resonator 1222 to the second CPW resonator 1226. The bump bond 1230 can be formed of a desired conductive material (e.g., a superconducting material, such as Indium or other desired superconducting material).

Interactions and coupling between the first qubit 1202 and second qubit 1208 can be selectively implemented or engaged via the TCQs 1204 and 1210, via the CPW resonators 1222 and 1226, and via the bump bond 1230, based on respective magnetic fluxes or respective modified magnetic fluxes applied to the respective TCQs 1204 and 1210 (e.g., by respective coil components), such as more fully described herein.

Figure 13:
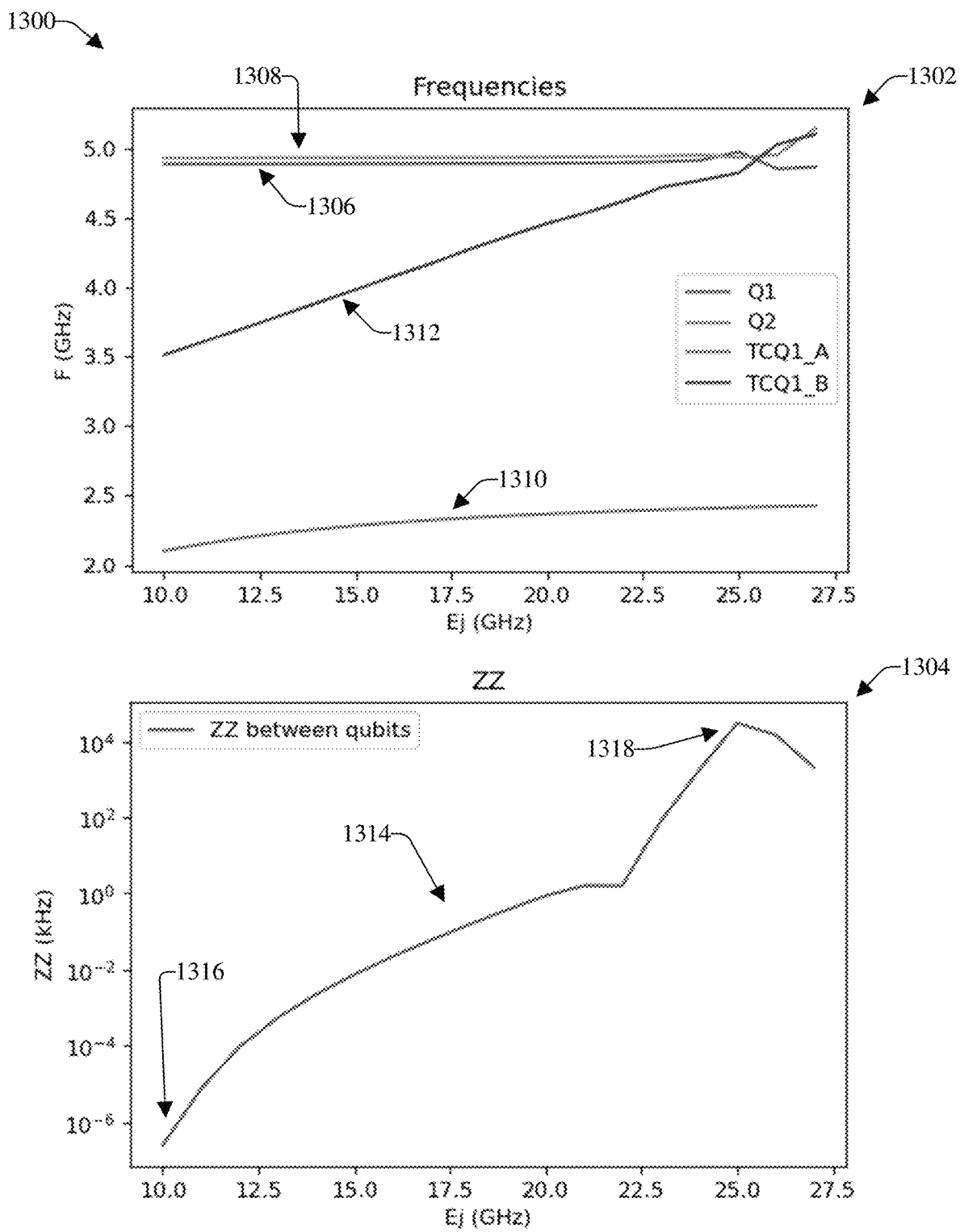
FIG. 13 presents a diagram of example graphs relating to long-range coupling of qubits associated with TCQs that are connected via a CPW resonator, in accordance with various aspects and embodiments of the disclosed subject matter.

Referring briefly to FIG. 13 (along with FIG. 11), FIG. 13 presents a diagram of example graphs 1300 relating to long-range coupling of qubits associated with TCQs that are connected via a CPW resonator, in accordance with various aspects and embodiments of the disclosed subject matter. A coupling may be defined as an interaction between two systems (e.g., between a first system, comprising a first qubit and/or a first TCQ, and a second system, comprising a second qubit and/or a second TCQ) strong enough to create a multi-qubit gate (e.g., between two qubits) and/or a desired exchange of information or energy between two electronic elements (e.g., qubits, resonators, or other desired electronic elements or components). The graphs 1300 can comprise graph 1302 relating to frequencies (F), in GHz, associated with the qubits (e.g., 1102 and 1104) and modes of a TCQ (e.g., 1106) as a function of Josephson energies, $E_j$, in GHz. The graphs 1300 also can comprise graph 1304 relating to ZZ interaction, in kHz, between the qubits (e.g., 1102 and 1104) as a function of Josephson energies, $E_j$, in GHz.

The graph 1302 can comprise data points 1306 relating to frequencies of the first qubit (e.g., 1102) as a function of Josephson energies; data points 1308 relating to frequencies of the second qubit (e.g., 1104) as a function of Josephson energies; data points 1310 relating to frequencies of the "A" mode the TCQ (e.g., 1106) as a function of Josephson energies; and data points 1312 relating to frequencies of the "B" mode the TCQ (e.g., 1106) as a function of Josephson energies. The graph 1304 can comprise data points 1314 indicating the amount of ZZ interaction between the first qubit and second qubit for various Josephson energies, $E_j$, in an example scenario.

The Josephson energy, $E_j$, of the SQUID of the TCQ (e.g., 1106) can be varied across a desired sweep range. In this example scenario, a 5 GHz CPW resonator can be used as a bus between the TCQs (e.g., 1106 and 1108), with the coupling capacitor to the middle paddle of either TCQ being 20 femtofarads. As can be observed in the graph 1304 (e.g., the data points 1314 of the graph 1304), when the TCQ (e.g., 1106) is in the off position or state, there can be a desirably low ZZ (e.g., <1e-5 kHz) between the qubits (e.g., 1102 and 1104), and, when the TCQ (e.g., 1106) is in the on position or state, there can be a desirably high ZZ interaction (e.g., >10 MHz) between the qubits (e.g., 1102 and 1104), as indicated at reference numerals 1316 and 1318, respectively.

Figure 14:
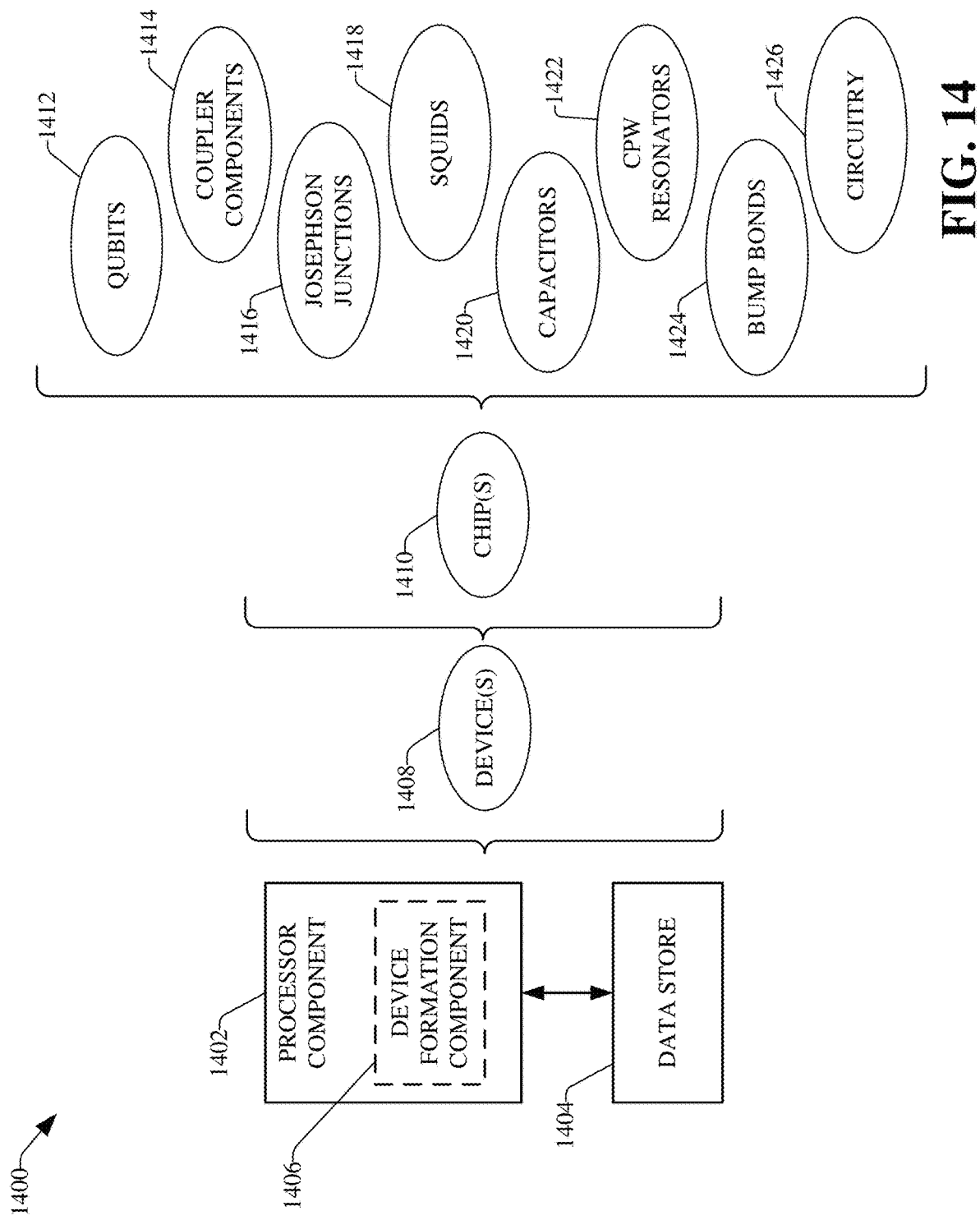
FIG. 14 depicts a block diagram of an example system that can be utilized to create, form, or design a device comprising qubits, coupler components, and/or other quantum components, elements, or circuitry, in accordance with various aspects and embodiments of the disclosed subject matter.

FIG. 14 depicts a block diagram of an example system 1400 that can be utilized to create, form, or design a device comprising qubits, coupler components (e.g., TCQs), and/or other quantum components, elements, or circuitry, in accordance with various aspects and embodiments of the disclosed subject matter. The system 1400 can comprise a processor component 1402 and a data store 1404. In accordance with various embodiments, the processor component 1402 can comprise or be associated with (e.g., communicatively connected to) a device formation component 1406 that can be utilized to create, form, or design various components of or associated with a device 1408 (or a system comprising one or more devices), including qubits, coupler components (e.g., TCQs), and associated quantum components, elements, or circuitry, such as more fully described herein. For instance, the device formation component 1406 can be utilized to create, form, or design the various components of a device 1408 (or a system) that can be formed or situated on one or more chips 1410 (e.g., a quantum computer or qubit device IC chip(s)). The various components can comprise, for example, qubits 1412, coupler components 1414, JJs 1416, SQUIDS 1418, capacitors 1420, CPW resonators 1422, bump bonds 1424, and/or associated circuitry 1426.

As part of and to facilitate creating, forming, or designing the various components of or associated with a device 1408, the device formation component 1406 can form or process substrates. Also, as part of and to facilitate creating, forming, or designing the various components and/or circuitry of or associated with the device 1408, the device formation component 1406 also can form, deposit, remove (e.g., selectively remove or etch), pattern, or process materials, including silicon or silicon-based materials (e.g., dielectric materials), superconducting materials (e.g., niobium-based, indium-based, aluminum-based, or other desired superconducting material), or other materials of the device 1408. For example, the device formation component 1406 can employ and/or can control various processes, including fabrication processes, microfabrication processes, nanofabrication processes, material deposition processes (e.g., a low pressure chemical vapor deposition (LPCVD) process), masking or photoresist processes, photolithography processes, chemical etching processes (e.g., reactive-ion etching (RIE) process, a potassium hydroxide (KOH) etching process), other etching or removal processes, epitaxial processes, material straining processes, patterning processes, planarization processes (e.g., chemical-mechanical planarization (CMP) process), component formation processes, and/or other desired processes to desirably form, deposit, remove (e.g., selectively remove or etch), pattern, or process materials to facilitate creating or forming the respective components or circuitry of the device 1408.

The processor component 1402 can work in conjunction with the other components (e.g., the data store 1404, the device formation component 1406, or another component) to facilitate performing the various functions of the system 1400. The processor component 1402 can employ one or more processors, microprocessors, or controllers that can process data, such as information relating to designing, creating, or forming quantum computers, qubits 1412, coupler components 1414, JJs 1416, SQUIDS 1418, capacitors 1420, CPW resonators 1422, bump bonds 1424, waveguides, electrodes, filters, other components or devices, and/or associated circuitry 1426, and information relating to circuit design criteria, circuit design algorithms, traffic flows, policies, protocols, interfaces, tools, and/or other information, to facilitate operation of the system 1400, as more fully disclosed herein, and control data flow between the system 1400 and other components (e.g., computer components, computer, laptop computer, other computing or communication device, or network device) associated with (e.g., connected to) the system 1400.

The data store 1404 can store data structures (e.g., user data, metadata), code structure(s) (e.g., modules, objects, hashes, classes, procedures) or instructions, information relating to designing, creating, or forming quantum computers, qubits 1412, coupler components 1414, JJs 1416, SQUIDS 1418, capacitors 1420, CPW resonators 1422, bump bonds 1424, waveguides, electrodes, filters, other components or devices, and/or associated circuitry 1426, and information relating to circuit design criteria, circuit design algorithms, traffic flows, policies, protocols, interfaces, tools, and/or other information, to facilitate controlling operations associated with the system 1400. In an aspect, the processor component 1402 can be functionally coupled (e.g., through a memory bus) to the data store 1404 in order to store and retrieve information desired to operate and/or confer functionality, at least in part, to the data store 1404, the device formation component 1406, or other component, and/or substantially any other operational aspects of the system 1400. The data store 1404 described herein can comprise volatile memory and/or nonvolatile memory, such as described herein.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 15:
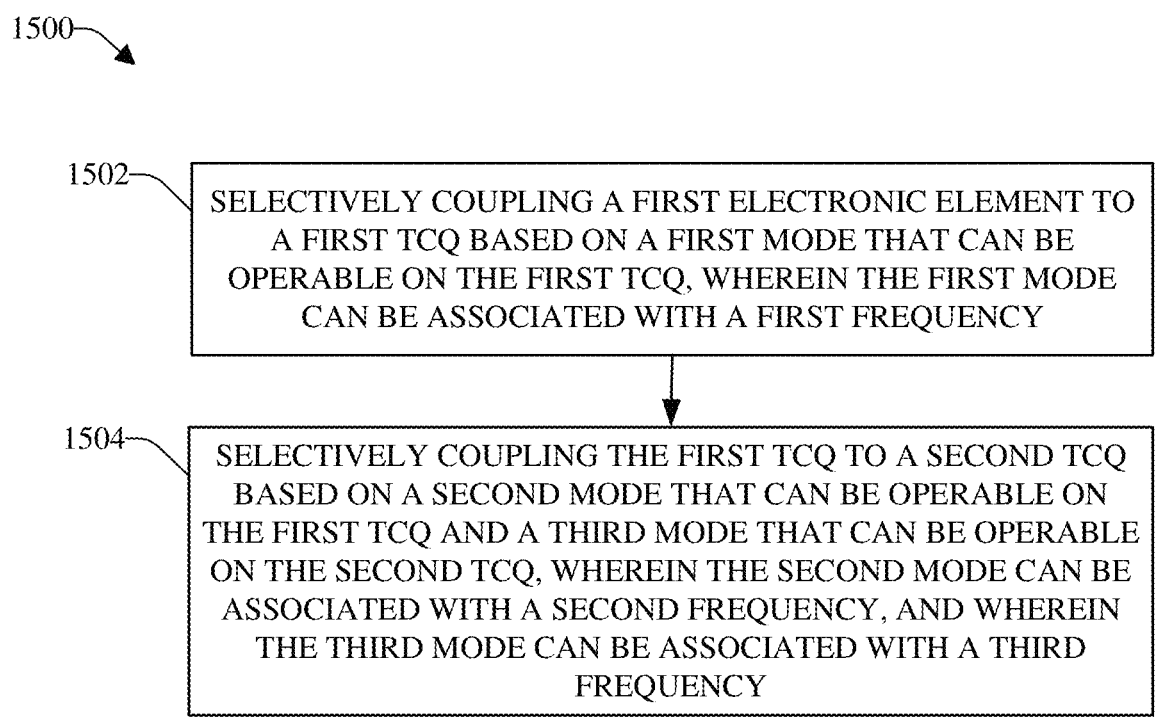
FIG. 15 illustrates a flow diagram of an example, non-limiting method that can employ a pair of TCQs to control interactions, coupling, or gates between components of a quantum circuit, in accordance with various aspects and embodiments of the disclosed subject matter.

FIG. 15 illustrates a flow diagram of an example, non-limiting method 1500 that can employ a pair of TCQs to control interactions, coupling, or gates between components of a quantum circuit, in accordance with various aspects and embodiments of the disclosed subject matter. The method 1500 can be performed by, for example, a system comprising or operatively coupled to a pair of TCQs. Repetitive description of like elements employed in other embodiments described herein is or may be omitted for sake of brevity.

At 1502, a first electronic element can be selectively coupled to a first TCQ based on a first mode that can be operable on the first TCQ, wherein the first mode can be associated with a first frequency. In some embodiments, the first electronic element can be a qubit (e.g., transmon qubit, quadrupole transmon qubit, or other type of qubit), although in other embodiments, the first electronic element can be a different type of component, such as a resonator.

At 1504, the first TCQ can be selectively coupled to a second TCQ based on a second mode that can be operable on the first TCQ and a third mode that can be operable on the second TCQ, wherein the second mode can be associated with a second frequency, and wherein the third mode can be associated with a third frequency. The third frequency can be different from or same as the second frequency (and can be different from the first frequency). In some embodiments, the second TCQ can be selectively coupled to a second electronic element (e.g., qubit, resonator, or other type of component) based on a fourth mode that can be operable on the second TCQ, wherein the fourth mode can be associated with a fourth frequency that can be different from or same as the first frequency (and can be different from the third frequency and second frequency). The respective selective couplings between the respective components (e.g., first electronic element, first TCQ, second TCQ, and/or second electronic element) can be controlled (e.g., enabled or permitted; or suppressed or squelched) based on respective magnetic fluxes, or respective modifications to respective magnetic fluxes, that can be applied to the first TCQ and second TCQ by respective coil components, such as described herein.

Figure 16:
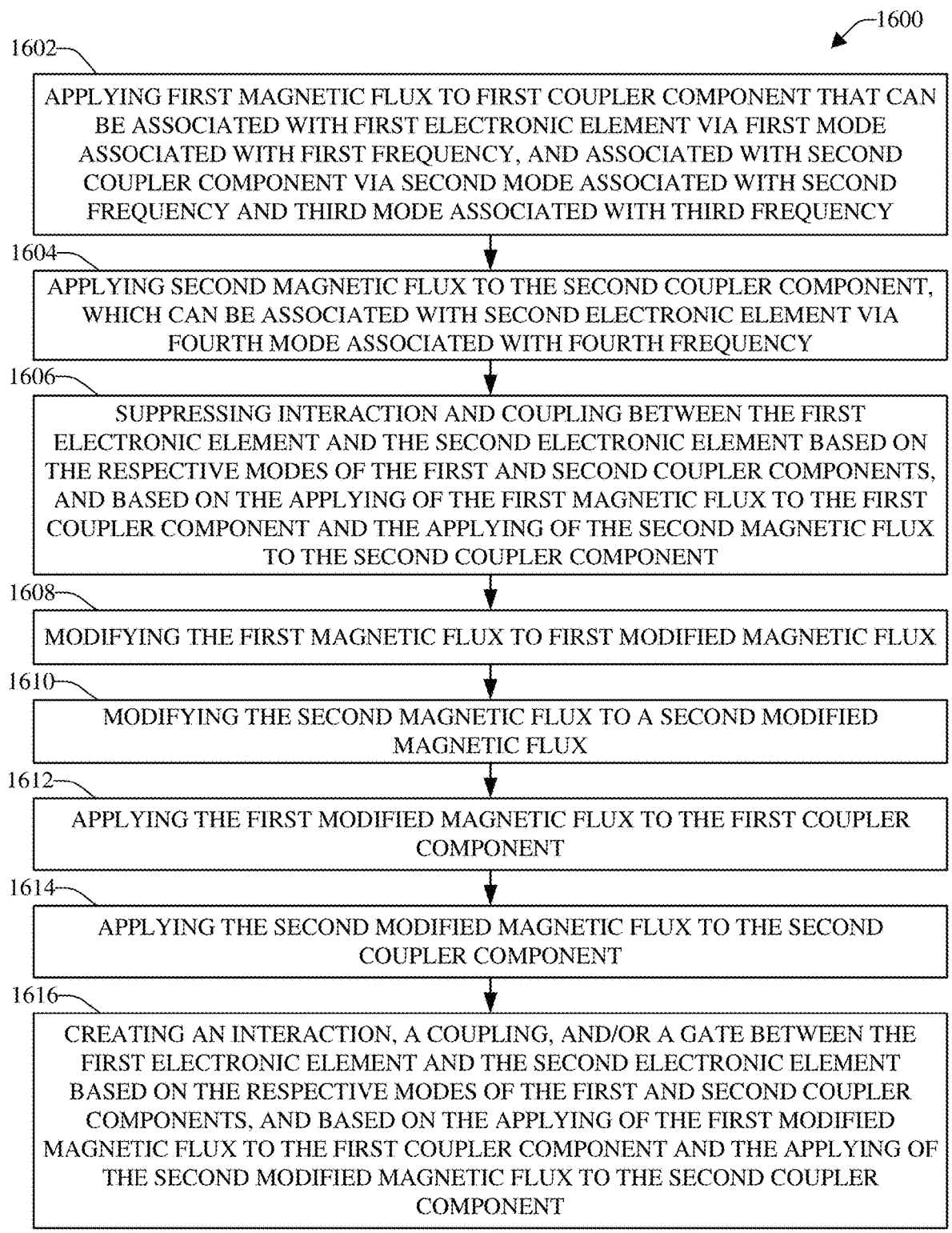
FIG. 16 depicts a flow diagram of another example, non-limiting method that can employ a pair of coupler components to control interactions, coupling, or gates between components of a quantum circuit, in accordance with various aspects and embodiments of the disclosed subject matter.

FIG. 16 depicts a flow diagram of another example, non-limiting method 1600 that can employ a pair of coupler components (e.g., TCQs) to control interactions, coupling, or gates between components of a quantum circuit, in accordance with various aspects and embodiments of the disclosed subject matter. The method 1600 can be performed by, for example, a system comprising or operatively coupled to a pair of TCQs. Repetitive description of like elements employed in other embodiments described herein is or may be omitted for sake of brevity.

At 1602, a first magnetic flux can be applied to a first coupler component that can be associated with a first electronic element via a first mode associated with a first frequency, and associated with a second coupler component via a second mode associated with a second frequency and a third mode associated with a third frequency. At 1604, a second magnetic flux can be applied to the second coupler component, which can be associated with a second electronic element via a fourth mode associated with a fourth frequency. The first coupler component can comprise the first mode (e.g., "A" mode) associated with the first frequency and the second mode (e.g., "B" mode) associated with the second frequency. The second coupler component can comprise the third mode (e.g., another "B" mode) associated with the third frequency and the fourth mode (e.g., another "A" mode) associated with the fourth frequency.

The first coupler component can be selectively coupled to or otherwise associated with the first electronic element (e.g., qubit, resonator, or other type of electronic element)

based on the first mode operable on the first coupler component. At the other end of the first coupler component, the first coupler component can be selectively coupled to or otherwise associated with the second coupler component based on the second mode operable on the first coupler component and the third mode operable on the second coupler component. At the other end of the second coupler component, the second coupler component can be selectively coupled to or otherwise associated with the second electronic element (e.g., qubit, resonator, or other type of electronic element) based on the fourth mode operable on the second coupler component.

A first coil component can generate the first magnetic flux, based on a first input current, and can apply the first magnetic flux to the first coupler component. A second coil component can generate the second magnetic flux, based on a second input current, and can apply the second magnetic flux to the second coupler component.

At 1606, interaction and coupling between the first electronic element and the second electronic element can be suppressed based on the respective modes of the first and second coupler components, and based on the applying of the first magnetic flux to the first coupler component and the applying of the second magnetic flux to the second coupler component. The first magnetic flux applied to a first SQUID of the first coupler component can be a first amount of magnetic flux that can cause the critical current of the first SQUID, and accordingly, a first energy (e.g., first Josephson energy) associated with the first SQUID, to be equal or at least substantially equal to a critical current of a JJ of the first coupler component, and accordingly, a second energy (e.g., second Josephson energy) associated with that JJ. The second magnetic flux applied to a second SQUID of the second coupler component can be a second amount of magnetic flux that can cause the critical current of the second SQUID, and accordingly, a third energy (e.g., third Josephson energy) associated with the second SQUID, to be equal or at least substantially equal to a critical current of a JJ of the second coupler component, and accordingly, a fourth energy (e.g., fourth Josephson energy) associated with that JJ. As a result, there can be a balancing of the first energy and the second energy associated with the first coupler component, and a balancing of the third energy and the fourth energy associated with the second coupler component, which can provide and/or enforce desired mode-selective coupling associated with the first and second coupler components, and which can thereby cause or create a desired suppression (e.g., squelching) of interaction or coupling (e.g., ZZ, static ZZ, and/or exchange interaction or coupling) between the first electronic element and the second electronic element to essentially or approximately zero interaction or coupling.

At 1608, the first magnetic flux can be modified to a first modified magnetic flux. At 1610, the second magnetic flux can be modified to a second modified magnetic flux. At 1612, the first modified magnetic flux can be applied to the first coupler component. At 1614, the second modified magnetic flux can be applied to the second coupler component. The first coil component can modify the first magnetic flux to the first modified magnetic flux based on a modified first input current that can be input to the first coil component. The first coil component can apply the first modified magnetic flux to the first coupler component. The second coil component can modify the second magnetic flux to the second modified magnetic flux based on a modified second input current that can be input to the second coil component.

The second coil component can apply the second modified magnetic flux to the second coupler component.

At 1616, an interaction, a coupling, and/or a gate between the first electronic element and the second electronic element can be created based on the respective modes of the first and second coupler components, and based on the applying of the first modified magnetic flux to the first coupler component and the applying of the second modified magnetic flux to the second coupler component. The modifying (e.g., changing or adjusting) of the first magnetic flux to the first modified magnetic flux that is being applied to the first SQUID of the first coupler component can create an imbalance between the first energy (e.g., as modified based on the first modified magnetic flux) associated with the first SQUID and the second energy of the JJ of the first coupler component and excite the "B" mode of the first coupler component, which can alter the mode-selective coupling associated with the first coupler component such that the first electronic element can have desired interaction or coupling to both the first mode and second mode of the first coupler component.

Similarly, the modifying of the second magnetic flux to the second modified magnetic flux that is being applied to the second SQUID of the second coupler component can create an imbalance between the third energy (e.g., as modified based on the second modified magnetic flux) associated with the second SQUID and the fourth energy of the JJ of the second coupler component and excite the "B" mode of the second coupler component, which can alter the mode-selective coupling associated with the second coupler component such that the second electronic element can have desired interaction or coupling to both the third mode and fourth mode of the second coupler component. Such altering of the mode-selective coupling associated with the first and second coupler components also can create a desired coupling between the first coupler component and the second coupler component. As a result, a desired interaction, coupling, and/or gate (e.g., ZZ interaction or coupling, exchange interaction or coupling, exchange gate, and/or CPHASE gate) can be created between the first electronic element and the second electronic element via the first and second coupler components.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 17:
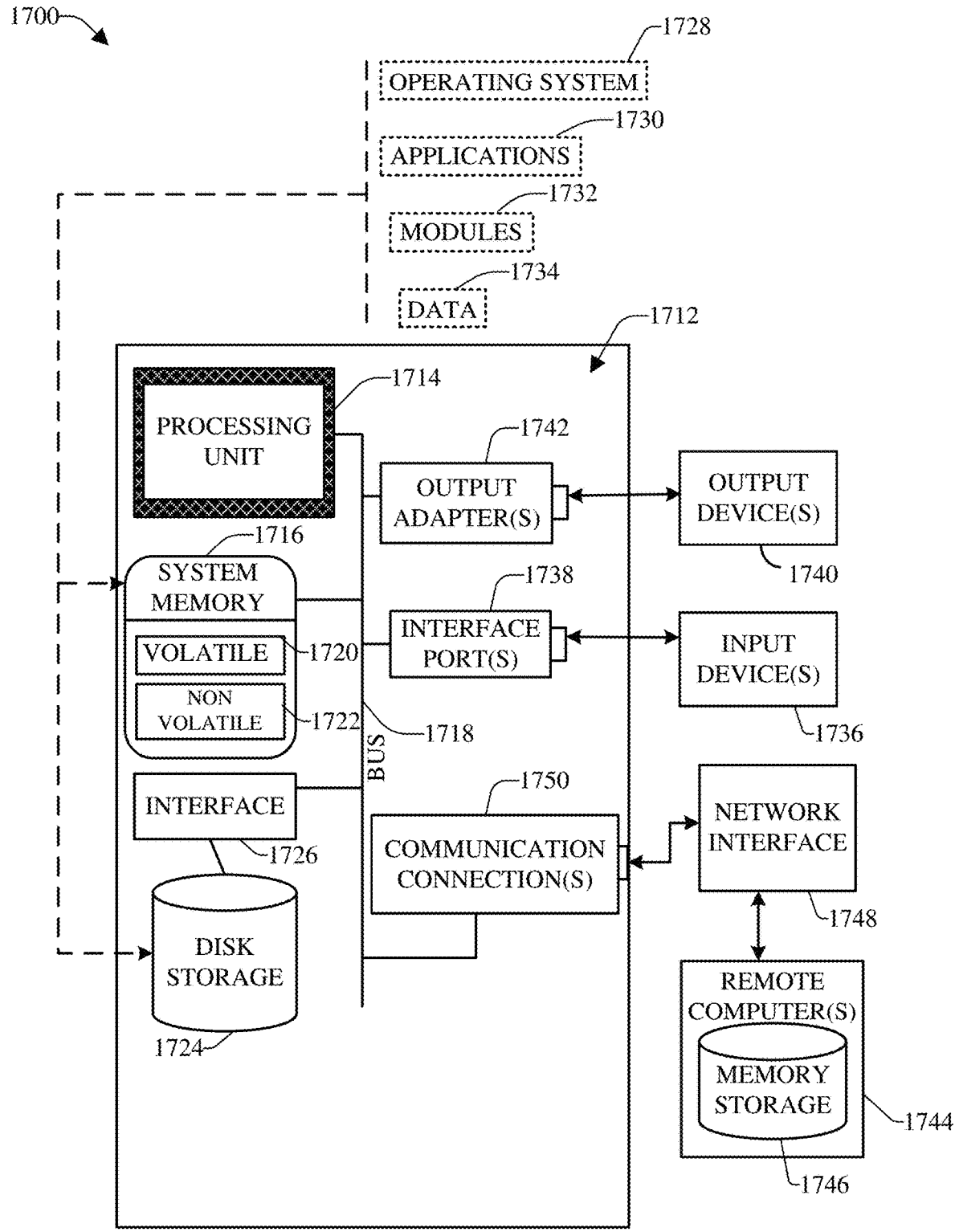
FIG. 17 illustrates a block diagram of an example, non-limiting operating environment in which one or more embodiments described herein can be facilitated.

In order to provide a context for the various aspects of the disclosed subject matter, FIG. 17 as well as the following discussion are intended to provide a general description of a suitable environment in which the various aspects of the disclosed subject matter can be implemented. FIG. 17 illustrates a block diagram of an example, non-limiting operating environment in which one or more embodiments described herein can be facilitated. Repetitive description of like elements employed in other embodiments described herein is or may be omitted for sake of brevity. With reference to FIG. 17, a suitable operating environment 1700 for implementing various aspects of this disclosure can also include a computer 1712. The computer 1712 can also include a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714. The system bus 1718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1716 can also include volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Computer 1712 can also include removable/non-removable, volatile/non-volatile computer storage media. FIG. 17 illustrates, for example, a disk storage 1724. Disk storage 1724 can also include, but is not limited to, devices like a magnetic disk drive, floppy disk drive, tape drive, Jaz drive, Zip drive, LS-100 drive, flash memory card, or memory stick. The disk storage 1724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used, such as interface 1726. FIG. 17 also depicts software that acts as an intermediary between users and the basic computer resources described in the suitable operating environment 1700. Such software can also include, for example, an operating system 1728. Operating system 1728, which can be stored on disk storage 1724, acts to control and allocate resources of the computer 1712. System applications 1730 take advantage of the management of resources by operating system 1728 through program modules 1732 and program data 1734, e.g., stored either in system memory 1716 or on disk storage 1724. It is to be appreciated that this disclosure can be implemented with various operating systems or combinations of operating systems. A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port can be used to provide input to computer 1712, and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a method of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a computer, a server, a router, a network PC, a workstation, a microprocessor based appliance, a peer device or other common network node and the like, and typically can also include many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1750 refers to the hardware/software employed to connect the network interface 1748 to the system bus 1718. While communication connection 1750 is shown for illustrative clarity inside computer 1712, it can also be external to computer 1712. The hardware/software for connection to the network interface 1748 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a RAM, a ROM, an erasable programmable read-only memory (EPROM or Flash memory), a SRAM, a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and RDRAM. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a first quantum component; and
   a first coupler qubit operable in a first mode associated with a first frequency and a second mode associated with a second frequency, wherein the first coupler qubit is selectively coupled to the first quantum component based on the first mode, wherein the first coupler qubit is selectively coupled to a second coupler qubit based on the second mode and based on a third mode operable on the second coupler qubit, and wherein the third mode is associated with a third frequency, and
   wherein, based on the first coupler qubit being selectively coupled to the first quantum component via the first mode, the first coupler qubit being selectively coupled to the second coupler qubit via the second mode and the third mode, and the second coupler qubit being selectively coupled to a second quantum component via a fourth mode associated with a fourth frequency, a ZZ interaction and a static ZZ interaction between the first quantum component and the second quantum component are suppressed, and an exchange interaction between the first quantum component and the second quantum component is suppressed for a defined range of frequencies associated with the first quantum component and the second quantum component.

2. The system of claim 1, wherein the first quantum component is a first qubit, wherein the second coupler qubit is operable in the fourth mode associated with the fourth frequency, and wherein the system further comprises: a second qubit, wherein the second coupler qubit is selectively coupled to the second qubit based on the fourth mode, and wherein the second quantum component is the second qubit.

3. The system of claim 2, wherein, based on the first coupler qubit being selectively coupled to the first qubit via the first mode, the first coupler qubit being selectively coupled to the second coupler qubit via the second mode and the third mode, and the second coupler qubit being selectively coupled to the second qubit via the fourth mode, the ZZ interaction and the static ZZ interaction between the first qubit and the second qubit is suppressed, and the exchange interaction between the first qubit and the second qubit is suppressed for the defined range of frequencies associated with the first qubit and the second qubit.

4. The system of claim 1, wherein the first coupler qubit comprises a Josephson junction and a superconducting quantum interference device associated with the Josephson junction, and wherein the superconducting quantum interference device is flux tuneable.

5. The system of claim 1, further comprising:
   a capacitor component comprising a first plate and a second plate, wherein the first plate is connected to the first coupler qubit, and wherein the second plate is connected to the second coupler qubit.

6. The system of claim 1, further comprising:
   a first capacitor component comprising a first plate and a second plate;
   a second capacitor component comprising a third plate and a fourth plate; and
   a coplanar-waveguide resonator comprising a first port and a second port, wherein the first plate is connected to the first coupler qubit, wherein the second plate is connected to the first port, wherein the third plate is connected to the second port, and wherein the fourth plate is connected to the second coupler qubit.

7. The system of claim 6, further comprising:
   a first die and a second die; and
   a bump bond, wherein the first coupler qubit, the first capacitor component, and a first portion of the coplanar-waveguide resonator are on the first die, wherein the second coupler qubit, the second capacitor component, and a second portion of the coplanar-waveguide resonator are on the second die, and wherein the first portion of the coplanar-waveguide resonator and the second portion of the coplanar-waveguide resonator are connected via the bump bond.

8. The system of claim 1, further comprising:
   a third coupler qubit;
   a group of capacitor components, comprising a first capacitor component, a second capacitor component, and a third capacitor component; and
   a bus component that is associated with the group of capacitor components, wherein the first coupler qubit is associated with the first capacitor component, wherein the second coupler qubit is associated with the second capacitor component, and wherein the third coupler qubit is associated with the third capacitor component.

9. The system of claim 8, wherein the first capacitor component comprises a first plate and a second plate, wherein the second capacitor component comprises a third plate and a fourth plate, wherein the third capacitor component comprises a fifth plate and a sixth plate, wherein the first plate is connected to the first coupler qubit, wherein the third plate is connected to the second coupler qubit, wherein the fifth plate is connected to the third coupler qubit, and wherein the second plate, the fourth plate, and the sixth plate are connected to the bus component.

10. The system of claim 8, further comprising:
    a first coplanar-waveguide resonator comprising a first port and a second port;
    a second coplanar-waveguide resonator comprising a third port and a fourth port; or
    a third coplanar-waveguide resonator comprising a fifth port and a sixth port, wherein the first capacitor component comprises a first plate and a second plate, the second capacitor component comprises a third plate and a fourth plate, or the third capacitor component comprises a fifth plate and a sixth plate, wherein the first plate is connected to the first coupler qubit, the third plate is connected to the second coupler qubit, or the fifth plate is connected to the third coupler qubit, wherein the second plate is connected to the first port, the fourth plate is connected to the third port, or the sixth plate is connected to the fifth port, and wherein the second port, the fourth port, or the sixth port are connected to the bus component.

11. The system of claim 1, wherein the first quantum component is a quadrupole transmon qubit, wherein the quadrupole transmon qubit comprises a first capacitor pad, a second capacitor pad, a third capacitor pad, a fourth capacitor pad that are associated with a Josephson junction, wherein the second quantum component is a second coupler qubit, and wherein the system further comprises:
    a third coupler qubit; and
    a fourth coupler qubit, wherein the first capacitor pad and the second capacitor pad of the quadrupole transmon qubit are associated with the first coupler qubit, wherein the second capacitor pad and the third capacitor pad of the quadrupole transmon qubit are associated with the third coupler qubit, or wherein the third capacitor pad and the fourth capacitor pad of the quadrupole transmon qubit are associated with the fourth coupler qubit.

12. A method, comprising:
  selectively coupling a first electronic element to a first tuneable coupler qubit based on a first mode operable on the first tuneable coupler qubit, wherein the first mode is associated with a first frequency;
  selectively coupling the first tuneable coupler qubit to a second tuneable coupler qubit based on a second mode operable on the first tuneable coupler qubit and a third mode operable on the second tuneable coupler qubit, wherein the second mode is associated with a second frequency, and wherein the third mode is associated with a third frequency; and
  based on the selectively coupling of the first electronic element to the first tuneable coupler qubit based on the first mode, the selectively coupling of first tuneable coupler qubit to a second tuneable coupler qubit based on the second mode and the third mode, and selectively coupling the second tuneable coupler qubit to a second electronic element based on a fourth mode associated with a fourth frequency, squelching at least one of a ZZ coupling, a static ZZ coupling, or an exchange coupling between the first electronic element and the second electronic element.

13. The method of claim 12, wherein the first electronic element is a first qubit, wherein the second tuneable coupler qubit is operable in the fourth mode associated with the fourth frequency, wherein the second electronic element is a second qubit, and wherein the method further comprises:
  selectively coupling the second tuneable coupler qubit to the second qubit based on the fourth mode.

14. The method of claim 13, further comprising:
  applying a magnetic flux to a first superconducting quantum interference device of the first tuneable coupler qubit, wherein the applying of the magnetic flux enables a first critical current associated with the first superconducting quantum interference device to be equal to or substantially same as a second critical current associated with a Josephson junction of the first tuneable coupler qubit.

15. The method of claim 14, wherein the squelching further comprises:
  squelching at least one of the ZZ coupling, the static ZZ coupling, or the exchange coupling between the first qubit and the second qubit based on the first critical current associated with the first superconducting quantum interference device being equal to or substantially the same as the second critical current associated with the Josephson junction.

16. The method of claim 14, wherein the first superconducting quantum interference device enables the first tuneable coupler qubit to be flux tuneable, wherein a second superconducting quantum interference device of the second tuneable coupler qubit enables the second tuneable coupler qubit to be flux tuneable, wherein the magnetic flux is a first magnetic flux, wherein the Josephson junction is a first Josephson junction, and wherein the method further comprises:
  modifying the first magnetic flux applied to the first superconducting quantum interference device of the first tuneable coupler qubit;
  creating a first imbalance between a first energy associated with the first Josephson junction and a second energy associated with the first superconducting quantum interference device based on the modifying of the first magnetic flux;
  modifying a second magnetic flux applied to a second superconducting quantum interference device of the second tuneable coupler qubit, wherein the second tuneable coupler qubit comprises a second Josephson junction associated with the second superconducting quantum interference device;
  creating a second imbalance between a third energy associated with the second Josephson junction and a fourth energy associated with the second superconducting quantum interference device based on the modifying of the second magnetic flux; and
  creating an entangling gate between the first qubit and the second qubit based on the first imbalance and the second imbalance.

17. The method of claim 16, further comprising:
  based on the creating of the entangling gate:
    creating a first exchange coupling between the first qubit and the first tuneable coupler qubit;
    creating a second exchange coupling between the second qubit and the second tuneable coupler qubit; and
    creating a third exchange coupling between the first tuneable coupler qubit and the second tuneable coupler qubit; and
  based on the first exchange coupling, the second exchange coupling, and the third exchange coupling, generating the ZZ coupling between the first qubit and the second qubit.

18. The method of claim 17, wherein, based on the first exchange coupling, the second exchange coupling, and the third exchange coupling, a controlled-phase gate between the first qubit and the second qubit is allowed.

19. A device, comprising:
  a first electronic component;
  a first tuneable coupler qubit structured to be utilizable in a first mode of oscillation and a second mode of oscillation, wherein the first tuneable coupler qubit is selectively coupled to the first electronic component based on the first mode; and
  a second tuneable coupler qubit structured to be utilizable in a third mode of oscillation and a fourth mode of oscillation, wherein the first tuneable coupler qubit is selectively coupled to the second tuneable coupler qubit based on the second mode and the third mode,
  wherein, based on the first tuneable coupler qubit being selectively coupled to the first qubit via the first mode, the first tuneable coupler qubit being selectively coupled to the second tuneable coupler qubit via the second mode and the third mode, and the second tuneable coupler qubit being selectively coupled to a second electronic component via a fourth mode associated with a fourth frequency, a ZZ interaction or a static ZZ interaction between the first electronic component and the second electronic component is squelched, and an exchange interaction between the first electronic component and the second electronic component is squelched for a defined range of frequencies associated with the first electronic component and the second electronic component.

20. The device of claim 19, wherein the first electronic component is a first qubit, wherein the first mode is associated with a first frequency, the second mode is associated with a second frequency, the third mode is associated with a third frequency, and the fourth mode is associated with the fourth frequency, and wherein the device further comprises:

a second qubit, wherein the second tuneable coupler qubit is selectively coupled to the second qubit based on the fourth mode, wherein the second electronic component is the second qubit, and wherein, based on the first tuneable coupler qubit being selectively coupled to the first qubit via the first mode, the first tuneable coupler qubit being selectively coupled to the second tuneable coupler qubit via the second mode and the third mode, and the second tuneable coupler qubit being selectively coupled to the second qubit via the fourth mode, the ZZ interaction or the static ZZ interaction between the first qubit and the second qubit is squelched, and the exchange interaction between the first qubit and the second qubit is squelched for the defined range of frequencies associated with the first qubit and the second qubit.

* * * * *